(12) United States Patent
Holung et al.

(10) Patent No.: US 11,876,407 B2
(45) Date of Patent: Jan. 16, 2024

(54) ASSEMBLY FOR ROTARY MOTION USING ELECTROPERMANENT MAGNET ASSEMBLY

(71) Applicant: Lenovo (Singapore) Pte. Ltd., Singapore (SG)

(72) Inventors: Joseph Anthony Holung, Wake Forest, NC (US); Bouziane Yebka, Apex, NC (US); Philip John Jakes, Durham, NC (US); Tin-Lup Wong, Chapel Hill, NC (US); Joseph David Plunkett, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 349 days.

(21) Appl. No.: 16/945,463

(22) Filed: Jul. 31, 2020

(65) Prior Publication Data

US 2022/0037941 A1 Feb. 3, 2022

(51) Int. Cl.
*H02K 1/27* (2022.01)
*H02K 1/12* (2006.01)
*G06F 1/16* (2006.01)
*H02K 11/30* (2016.01)
*H02K 1/17* (2006.01)
*H02K 19/00* (2006.01)

(52) U.S. Cl.
CPC ............ *H02K 1/27* (2013.01); *G06F 1/1616* (2013.01); *G06F 1/1656* (2013.01); *G06F 1/1681* (2013.01); *H02K 1/12* (2013.01); *H02K 1/17* (2013.01); *H02K 11/30* (2016.01); *H02K 19/00* (2013.01)

(58) Field of Classification Search
CPC .. H02K 1/27; H02K 1/12; H02K 1/17; H02K 11/30; H02K 19/00; H02K 37/00; H02K 37/04
See application file for complete search history.

(56) References Cited

U.S. PATENT DOCUMENTS

| 9,882,461 | B2 * | 1/2018 | Shim ........................ H02K 3/28 |
| 2009/0167472 | A1 * | 7/2009 | Lu ........................ H04M 1/0216 |
| | | | 335/287 |
| 2012/0200180 | A1 * | 8/2012 | Mizumaki ............ H02K 11/215 |
| | | | 310/49.01 |
| 2015/0077033 | A1 * | 3/2015 | Lee ........................ H02K 37/14 |
| | | | 310/49.01 |

(Continued)

FOREIGN PATENT DOCUMENTS

| CN | 104795960 A | * | 7/2015 | ............. H02K 37/00 |
| KR | 2017058627 A | * | 5/2017 | ............... H02K 1/17 |

OTHER PUBLICATIONS

CN104795960A English translation (Year: 2022).*

(Continued)

*Primary Examiner* — Christopher M Koehler
*Assistant Examiner* — Viswanathan Subramanian
(74) *Attorney, Agent, or Firm* — Brian J. Pangrle

(57) ABSTRACT

An assembly can include a rotor that defines a rotor axis and that includes a number of permanent magnets; a stator that defines a stator axis, coaxially aligned with the rotor axis, and that includes a number of electropermanent magnets; and a controller that controls polarity of the electropermanent magnets to rotate the rotor about the rotor axis.

20 Claims, 30 Drawing Sheets

(56) References Cited

U.S. PATENT DOCUMENTS

| | | | | |
|---|---|---|---|---|
| 2016/0164394 A1* | 6/2016 | Knaian | ............... | H02K 21/046 |
| | | | | 310/12.17 |
| 2017/0220077 A1* | 8/2017 | Holung | ............... | G06F 1/1681 |
| 2020/0403483 A1* | 12/2020 | Norton | ................. | H02K 7/125 |

OTHER PUBLICATIONS

KR2017058627A English translation (Year: 2022).*

Zhu et al., A programmable actuator for combine motion and connection and its application to modular robot, Mechatronics, Elsevier, 2019, 58, pp. 9-19 (arXiv:1904.09889v1 [cs.RO]) (14 pages).

* cited by examiner

ASSEMBLY FOR ROTARY MOTION USING ELECTROPERMANENT MAGNET ASSEMBLY

TECHNICAL FIELD

Subject matter disclosed herein generally relates to electromagnetic movers.

BACKGROUND

An electromagnetic mover can be an assembly of components that can move one or more of the components responsive to supply of electrical energy.

SUMMARY

An assembly can include a rotor that defines a rotor axis and that includes a number of permanent magnets; a stator that defines a stator axis, coaxially aligned with the rotor axis, and that includes a number of electropermanent magnets; and a controller that controls polarity of the electropermanent magnets to rotate the rotor about the rotor axis. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
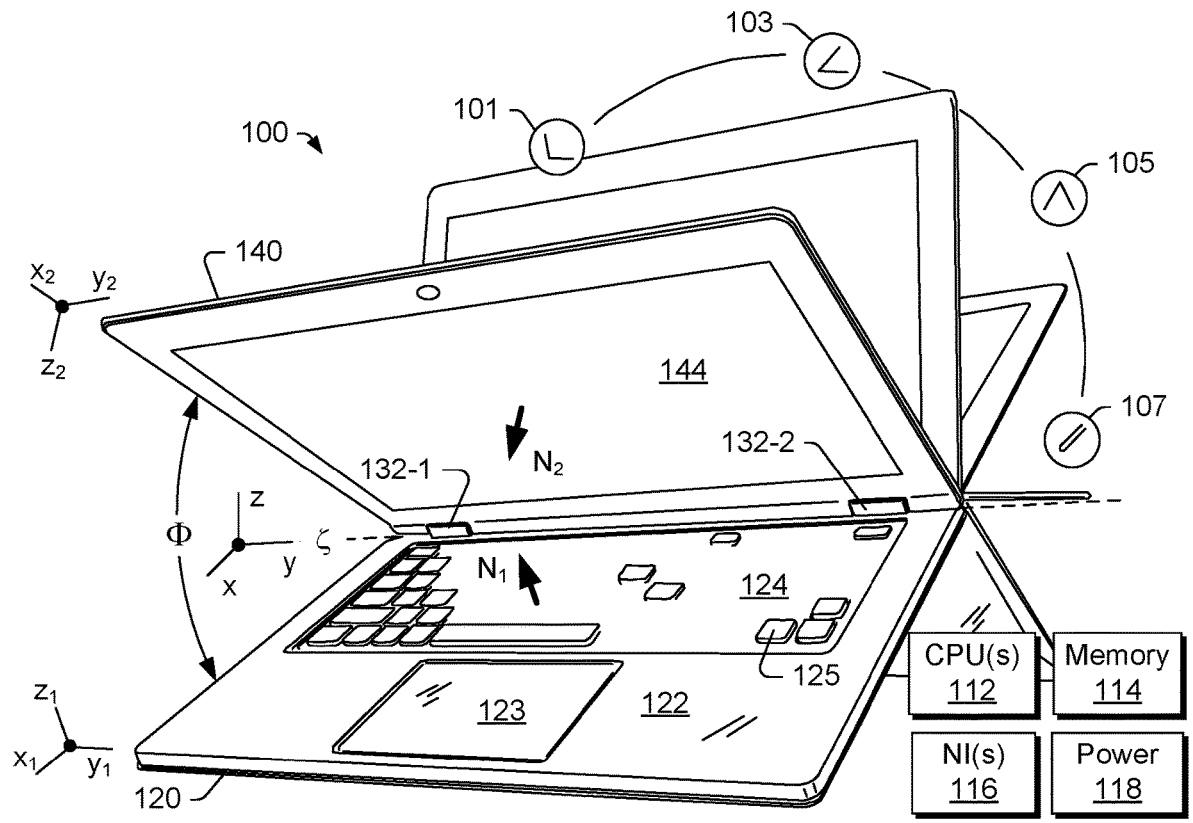
FIG. 1 is a diagram of an example of a system.
Figure 1:
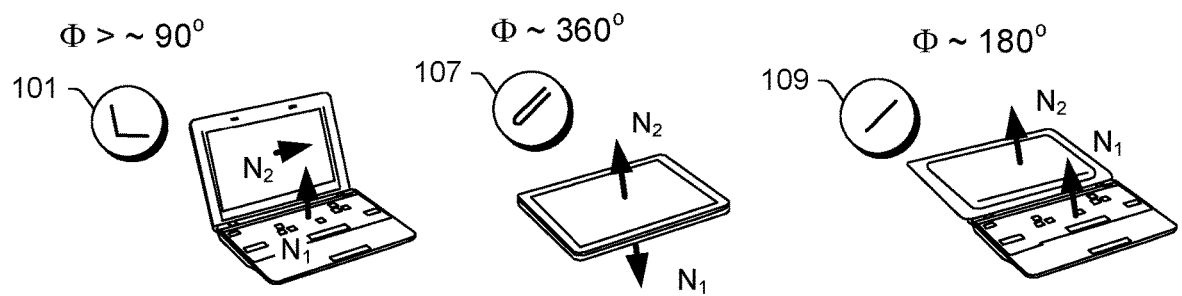

FIG. 1 shows an example of a system 100 that includes a keyboard housing 120 and a display housing 140 that are rotatable with respect to each other via movement about one or more hinges assemblies 132-1 and 132-2. The system 100 may be a device such as, for example, a computing device (e.g., an information handling device).

As an example, the system 100 may include one or more processors 112, memory 114 (e.g., one or more memory devices), one or more network interfaces 116, and one or more power cells 118 (e.g., one or more lithium-ion rechargeable batteries, etc.). Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a width along a y-axis ($y_1$), a length along an x-axis ($x_1$) and a height along a z-axis ($z_1$) that extends in a direction outwardly away from touch surfaces of keys 125 of the keyboard 124 and the display 144 is defined in a second Cartesian coordinate system as having a width along an y-axis ($y_2$), a length along an x-axis ($x_2$) and a height along a z-axis ($z_2$) that extends in a direction outwardly away from a viewing surface of the display 144. As an example, a coordinate system may be right-handed or left-handed.

As shown in the example of FIG. 1, the one or more hinge assemblies 132-1 and 132-2 rotatably connect the keyboard housing 120 and the display housing 140 for orienting the display housing 140 with respect to the keyboard housing 120. For example, orientations may include orientations definable with respect to an axis (e.g., or axes) such as the axis $\zeta$ and an angle $\Phi$ about that axis. In the example of FIG. 1, another Cartesian coordinate system is shown, with a y-axis that can be parallel to the axis $\zeta$ where the z-axis may be directed upwardly, opposite gravity where an x-axis and the y-axis can define a plane where the z-axis is normal to the x,y-plane. As an example, the system 100 can be positioned on a horizontal surface such as a desk surface (e.g., a desktop), a table surface, a countertop surface, etc., where the horizontal surface is parallel to the x,y-plane and where gravity is normal to the horizontal surface in a downwardly directed direction (e.g., acceleration due to gravity, G, is in a direction toward the ground). In various instances, the system 100 may be positioned on a surface or surfaces that are not horizontal (e.g., legs, a tilted desktop, etc.).

The system 100 can be defined by a mass, which can include a mass of the keyboard housing 120 and a mass of the display housing 140, which may be the same or may differ. For example, the mass of the keyboard housing 120 may exceed the mass of the display housing 140. In such an example, the keyboard housing 120 may help to stabilize the system 100 when positioned on a surface such as a horizontal surface. For example, consider the keyboard housing 120 as having a mass that exceeds a mass of the display housing 140 and where the keyboard housing 120 helps to stabilize the system 100 on a horizontal surface for angles (Φ) that exceeds approximately 90 degrees. In such an example, the mass difference may help to keep the system 100 from tipping backwards as the mass of the display housing 140 can generate a moment, which may be defined, for example, as a moment of force acting on an object (e.g., a torque), which may be the product of a force and a distance with respect to a reference point.

A force applied perpendicularly to a lever multiplied by its distance from a fulcrum of the lever (e.g., a length of the lever arm) can define the torque of the lever about the fulcrum. For example, a force of three newtons applied two meters from a fulcrum may exert the same torque as a force of one newton applied six meters from the fulcrum. As to a convention, the direction of torque may be determined by using a right hand grip rule where, if the fingers of the right hand are curled from the direction of the lever arm to the direction of the force, then the thumb points in the direction of the torque. For such a convention, when the angle Φ is greater than approximately 90 degrees, for a force equal to mg (e.g., F=mg) acting at a lever arm length of L, the torque points in the −y direction; whereas, when the angle Φ is less than approximately 90 degrees, the torque for the same force points in the +y direction; and, when the angle Φ is approximately 90 degrees, the torque is approximately zero.

Various clamshell types of systems that include one or more hinge assemblies may include one or more friction elements that impart friction that overcomes gravitational force and associated torque. Such a friction element approach can help to maintain a desired angle Φ, which may be, for example, a viewing angle such as an ergonomic viewing angle for a display by a user of a clamshell system, where the viewing angle can be defined between a keyboard housing and a display housing that includes the display. Such a friction element approach may provide for additional amount of friction such that vibration or some amount of shock does not cause a change in the viewing angle. For example, consider vibration from touch typing or consider a user on a plane, a train, in a car, etc., where a rough road, a curb, etc., may cause some amount of shock that does not overcome friction generated by one or more friction elements.

As to a shock, consider a downward movement of an object coupled to a hinge as a fulcrum that is abruptly halted. In such an example, the object may gain momentum such that the abrupt halt causes the object to overcome friction of the hinge and rotate about the hinge, which can be undesirable to a user.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both). As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.).

As to the orientation 103, it may correspond to a display orientation for viewing the display 144 where the keyboard 124 faces downward and the system 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other, whereas, in contrast, for a closed orientation of the system 100 (e.g., where the angle Φ is about 0 degrees), the vectors $N_1$ and $N_2$ would be pointing toward each other.

The orientation 109 may be a planar orientation where the angle Φ is approximately 180 degrees such that a normal outward vector $N_1$ of the keyboard 124 of the keyboard housing 120 and a normal outward vector $N_2$ of the display 144 of the display housing 140 are oriented in approximately the same pointing directions.

In the example of FIG. 1, one or more of the hinge assemblies 132-1 and 132-2 can include permanent magnets, which can be or include radially magnetized permanent magnets. In such an approach, the magnetic fields of the permanent magnets can generate torque, which may be analyzed in a static sense or a dynamic sense.

As to a static sense, consider torque that is generated to counter at least a portion of torque generated by the acceleration of gravity acting on an object with a mass where the object is rotatably coupled to another object. For example, consider the orientation 101 where torque is generated to counter torque generated by the acceleration of gravity acting on the display housing 140 such that angle Φ remains fixed, optionally without friction at a hinge assembly (e.g., consider a substantially frictionless hinge assembly or relatively low friction hinge assembly).

As an example, a system can include a first housing that includes a processor and memory accessible to the processor; a second housing that includes a display operatively coupled to the processor; and a hinge assembly that rotatably couples the first housing and the second housing, where the hinge assembly includes permanent magnets that generate a first magnetic field and a second magnetic field orientable with respect to each other via rotation of the second housing with respect to the first housing, where the first magnetic field and the second magnetic field include an aligned orientation, generate a clockwise restoring torque responsive to rotation in a first rotational direction from the aligned orientation, and generate a counter-clockwise restoring torque responsive to rotation in a second, opposite rotational direction from the aligned orientation.

Figure 2:
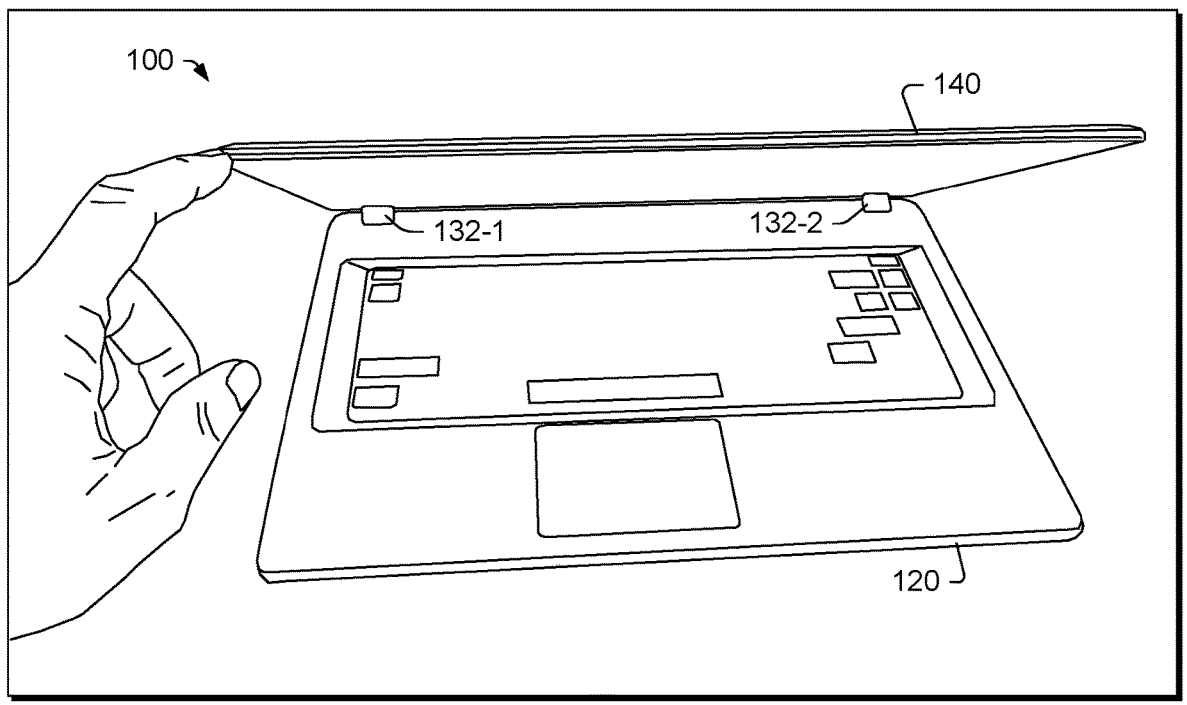
FIG. 2 is a perspective view of the system of FIG. 1.

FIG. 2 shows a perspective view of the system 100, which may be an apparatus (e.g., a device), where one or more of the hinge assemblies 132-1 and 132-2 include permanent magnets that generate torque that can be a restoring torque that counteracts a torque due to the acceleration of gravity acting upon the display housing 140. In such an example, the angle Φ may be adjustable by a user through use of minimal force. For example, a light touch from a tip of a finger of a user's hand may adjust the angle Φ where, once adjusted, the angle Φ does not change as torques, in opposing directions, can effectively cancel. The system 100 in the example of FIG. 2 may be referred to as a feather touch system in that touch to adjust a housing angle may be quite light.

As an example, a force demand may depend on overcoming a small amount of friction between components without involving a mass lifting force as may be associated with moving a center of mass of an object in a direction that is opposite that of the direction of the acceleration of gravity as such a mass lifting force may be counteracted by a permanent magnet hinge assembly (e.g., or assemblies).

Work can be defined as a product of weight (e.g., mg) and distance. If a display housing has a weight of 2 N (e.g., 0.204 kg multiplied by 9.8 m/s$^2$) and a center of mass that is 0.1 m from a rotational axis (e.g., maximum torque of 0.2 N-m or 20.4 kgf-mm), a rotation of the display housing about the rotational axis by an angular increment that increases the vertical height of the center of mass by 0.02 m against gravity would demand work of approximately 0.04 J. However, if the gravity torque is offset by a magnetic torque (e.g., a restoring torque), then the net torque can be zero and the amount of work performed by a user's hand can be approximately zero.

As to dynamics, a relatively slow adjustment to the angle Φ may be relatively free of velocity related effects such that a user does not experience resistance cause by velocity related magnetic field interactions. As an example, where velocity (change in position in a direction with respect to time) increases, some amount of force may be generated via velocity related magnetic field interactions, which may act to somewhat resist the direction of movement.

In the example of FIG. 2, the mass of the display housing 140 may be reduced when compared to a system that does not include one or more permanent magnet hinge assemblies that can supply a restoring torque. For example, in a system with a friction hinge assembly without permanent magnets, a display housing may be designed with a sufficient amount of structural rigidity to account for a user pushing or pulling on an upper corner of the display housing to open or close the system. As a display may be a relatively fragile component (e.g., akin to a thin plate of glass), the display housing can help to assure that the display does not twist in a manner that could lead to cracking or other damage (e.g., to liquid crystal structures, LED structures, etc.). Where a system includes a permanent magnet hinge assembly that supplies a restoring torque, adjustment of a display housing may be accomplished with little applied force, as illustrated in FIG. 2. As such, the risk of twisting the display housing may be reduced and, hence, fewer, lighter, etc., components may be utilized in constructing the display housing. Such a display housing may be lighter, thinner, etc., which, in turn, may demand lesser strength permanent magnets to generate a restoring force that offsets at least a portion of a gravity force (e.g., F=mg) of the display housing (e.g., a gravity related torque). Further, as the mass of a display housing decreases, the mass of a keyboard housing can decrease as well as the mass to avoid tipping over for angles Φ greater than 90 degrees diminishes. As another example, a system with a magnetic restoring torque hinge assembly may be made with a larger display (e.g., a larger footprint) that would otherwise be at risk of twisting damage when utilized with a friction hinge assembly that does not include permanent magnets that provide a restoring torque.

Referring again to the illustration of FIG. 2, a user may open a laptop computer using one or more fingers, for example, by applying a pinching force at an upper corner of a display housing between a forefinger and thumb while applying a directional force to rotate the display housing by overcoming frictional force at one or more friction hinges. In such an example, the display housing may twist such that the upper corner moves backwards in a plane, which can place a display at risk of damage. In contrast, as shown in FIG. 2, where one or more permanent magnet hinge assemblies are utilized to supply a restoring torque, a single fingertip may be utilized, which may be positioned in a manner such that a fingerprint is not left on a display of a display housing (e.g., consider a "frameless" display that extends to borders of a display housing). In such an example, ergonomics are improved, user experience is improved and, for example, depending on extent of a display, a risk of leaving a fingerprint on the display can be reduced.

Figure 3A:
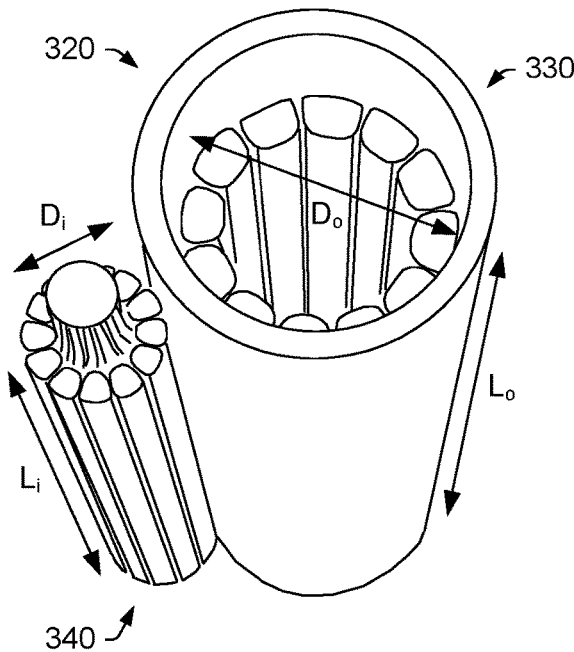
FIG. 3A, FIG. 3B and FIG. 3C are a series of diagrams of an example of a hinge assembly.
Figure 3C:
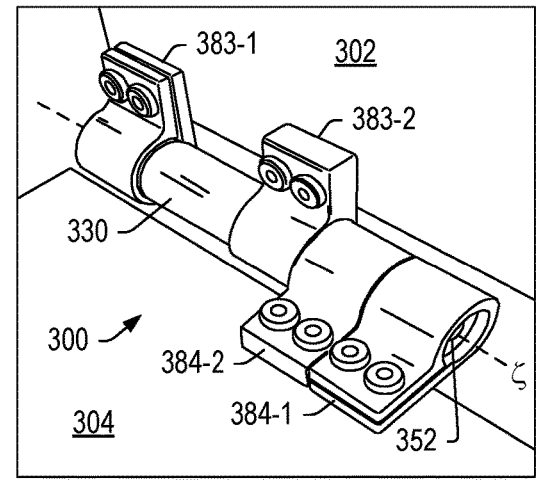
Figure 3B:
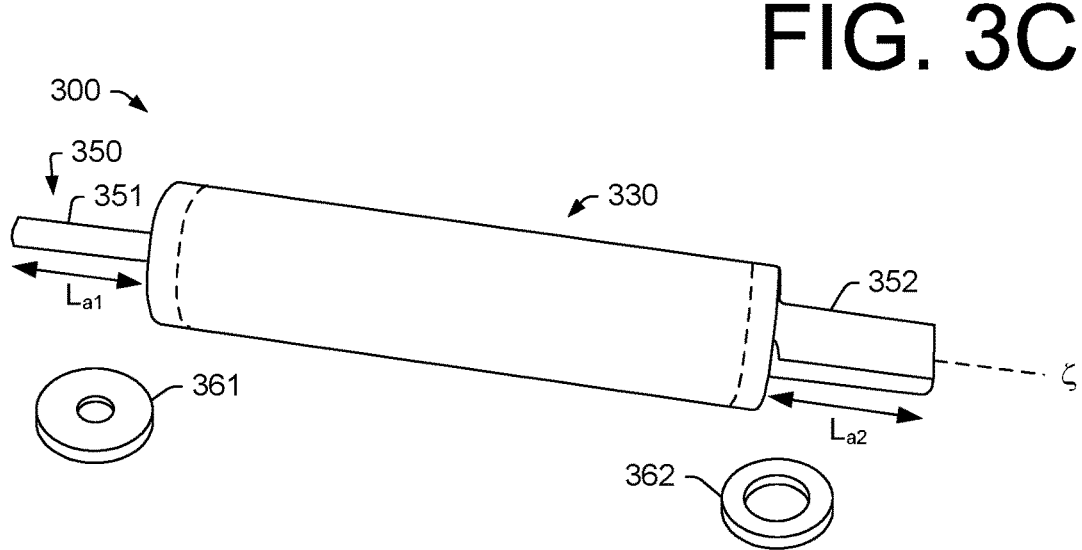

FIG. 3A and FIG. 3B show perspective views of examples of permanent magnets 320 and 340 that can be arranged to form an example hinge assembly 300, which can be a permanent magnet hinge assembly that supplies a restoring torque. As shown, the permanent magnets 320 and 340 are radially arranged where an axle 350 can support permanent magnetic material and where a casing 330 can support permanent magnetic material.

As shown, the permanent magnets 320 and 340 can be concentrically arranged along a common rotational axis where a first portion of the axle 350 is supported by a first bushing or bearing 361 and where a second portion of the axle 350 is supported by a second bushing or bearing 362. The bushings or bearings 361 and 362 may be of a common size and of common specifications or they may differ. As an example, one or more of the bushings or bearings 361 and 362 may be relatively frictionless (e.g., relatively low friction) such that friction force is small compared to forces generated by rotation of the permanent magnets 320 and 340 with respect to each other about the common rotational axis, which can be defined by an angle such as an angle α. For example, the angle α may be equal to zero when magnetic fields of the permanent magnets 320 and 340 are aligned. In such an example, consider the casing 330 supporting magnetic material that forms the permanent magnet 320 (e.g., or magnets) with a single north pole and a single south pole and the axle 350 supporting magnetic material that forms the permanent magnet 340 (e.g., or magnets) with a single north pole and a single south pole where the south pole of the permanent magnet 340 is aligned with the north pole of the permanent magnet 320. In such an alignment, the permanent magnets 320 and 340 can be defined to be in a stable steady state, whereas, if the south pole of the permanent magnet 340 is aligned with the south pole of the permanent magnet 320, the permanent magnets 320 and 340 can be defined to be in an unstable steady state. In an unstable steady state, a rotational perturbation can cause the alignment to transition from the unstable steady state to the stable steady state.

In the example of FIG. 3A and FIG. 3B, various dimensions are shown, which include a length $L_i$ and a diameter $D_i$ of the permanent magnet 340 and a length $L_o$ and a diameter $D_o$ of the permanent magnet 320. Further, the axle 350 is shown as including a first portion 351 with a length $L_{a1}$ and a second portion 352 with a length $L_{a2}$. The first portion 351 may be received via a bore in the first bushing or bearing 361 and rotatably supported therein in and the second portion 352 may be received via a bore in the second bushing or bearing 362 and rotatably supported therein. As shown in FIG. 3A and FIG. 3B, the length $L_i$ can be greater than $D_i$ and the length $L_O$ can be greater than $D_o$.

FIG. 3C shows the hinge assembly 300 operatively coupled to a first housing 302 and a second housing 304 via fittings 383-1, 383-2, 384-1 and 384-2. As shown, the fittings 383-1 and 383-2 can secure the casing 330 to the first housing 302 and the fittings 384-1 and 384-2 can secure the axle 350 to the second housing 304. In the example of FIG. 3C, the first portion 351 of the axle 350 may be shorter axially than the second portion 352 of the axle 350, where the second portion 352 is sufficiently long to provide a surface to be secured via one or more fittings such as the one or more fittings 384-1 and 384-2. As shown, a fitting may be a fix fitting, a guide fitting or a fitting may be an adjustable fitting. A guide fitting (see, e.g., the fittings 383-2 and 384-2) may guide a component along an axis while an adjustable fitting may allow for clamping a component and unclamping a component where, in an unclamped state, the component is translatable axially and/or rotatable azimuthally. For example, an assembly process may orient the housings 302 and 304 according to an angle (e.g., $\Phi=90$ degrees or $\alpha=0$ degrees, etc.) where the casing 330 and the axle 350 are fixed and/or clamped (e.g., via the fittings 383-1 and 384-1, respectively) such that the permanent magnets 320 and 340 are in a stable steady state.

Given definitions of a stable steady state and an unstable steady state, an intermediate state can be defined as corresponding to an orientation that is not that of the stable steady state and not that of the unstable steady state. In an intermediate state, there can be torque, which may be in one of two directions (e.g., acting clockwise or acting counterclockwise). For example, if the stable steady state is at an angle $\alpha$ equal to zero degrees and the unstable steady state is at an angle $\alpha$ equal to 180 degrees, then an intermediate state is an angle $\alpha$ that is not equal to zero degrees and not equal to 180 degrees.

Figure 4A:
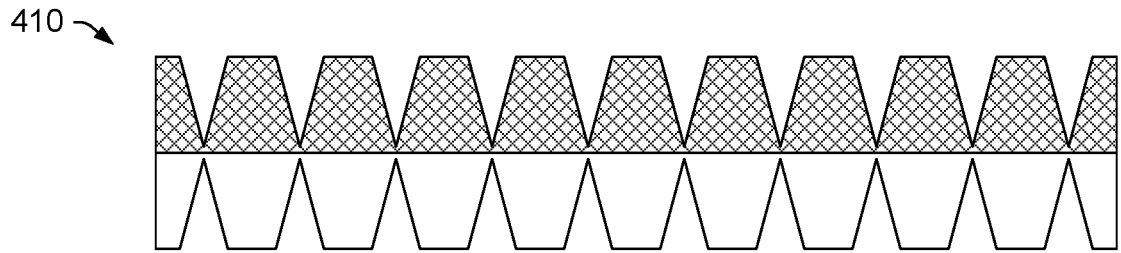
FIG. 4A and FIG. 4B are a series of diagrams of examples of one or more magnets.
Figure 4B:
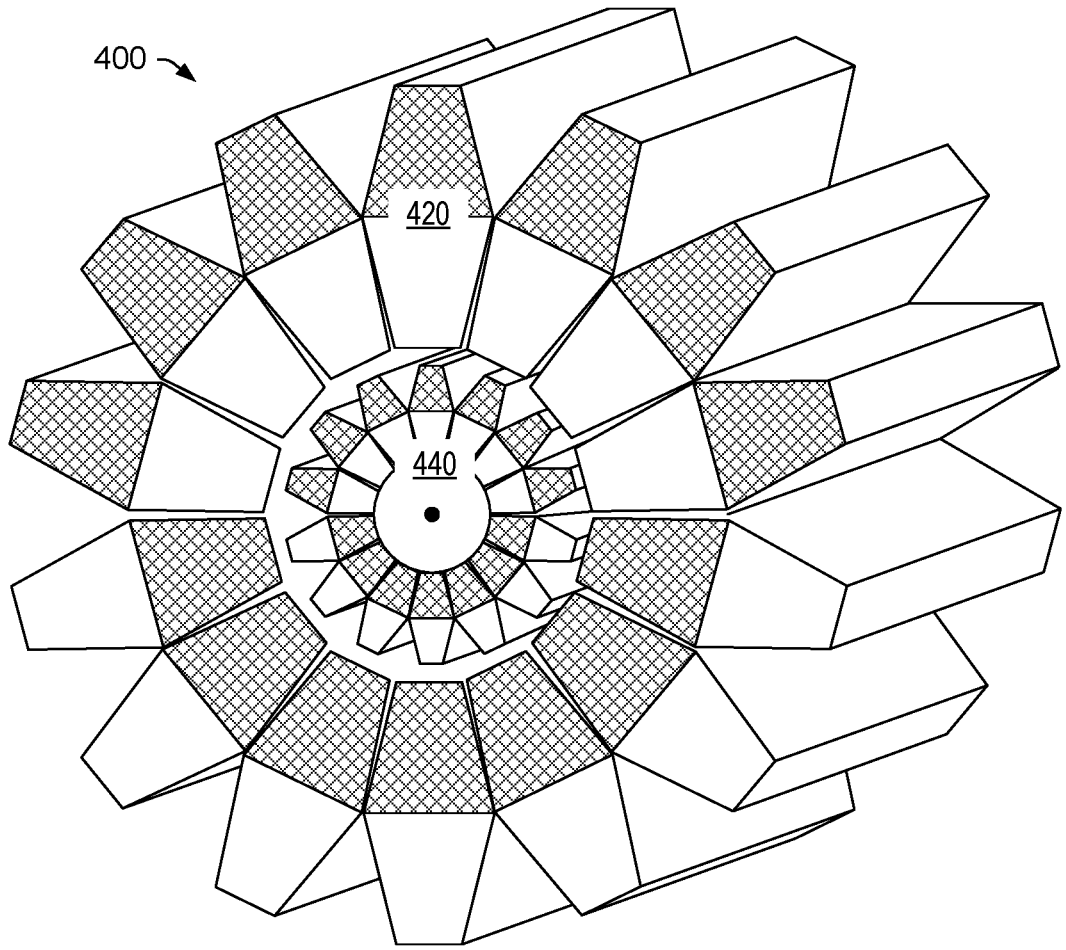

FIG. 4A and FIG. 4B show examples of a permanent magnet or permanent magnets 410, which may be magnetic material or magnetic materials that can form a stator 420 and rotor 440 arrangement 400. As shown, the arrangement 400 is in a stable steady state orientation as poles are aligned. In such an example, a rotation of the rotor 440 in a clockwise direction toward the unstable steady state orientation will generate torque on the rotor 440 in a counterclockwise direction. In such an example, the generated torque can be defined as a restoring torque that acts to restore the rotor 440 to the stable steady state orientation.

As to the permanent magnet or permanent magnets 410, consider a formed plate with appropriate cutouts that allow for formation of a radial arrangement or consider a series of elements that allow for formation of a radial arrangement. As shown, the permanent magnet or permanent magnets 410 may be formed into an arrangement with an inward north pole and outward south pole or with an inward south pole and an outward north pole.

As an example, one or more permanent magnets may be formed from material that can be magnetized (e.g., ferromagnetic material, etc.). For example, consider shaping material into a desired shape for a permanent magnet hinge assembly and then magnetizing the shaped material. As an example, a direct, an indirect or a direct and indirect approach may be utilized to form a permanent magnet.

As to a direct approach, as an example, current can be passed directly through material. Such an approach may involve clamping the material between two electrical contacts where current is passed through the material and a circular magnetic field is established in and around the material. When the magnetizing current is stopped, a residual magnetic field can remain within the material where the strength of the induced magnetic field can be proportional to the amount of current passed through the material.

As to an indirect approach, a strong external magnetic field may be utilized to establish a magnetic field within the material. Such an approach may utilize one or more of a permanent magnet, an electromagnet, a coil, a solenoid, etc. For example, consider a material that is placed longitudinally in a concentrated magnetic field that fills a center of a coil or solenoid.

Figure 5A:
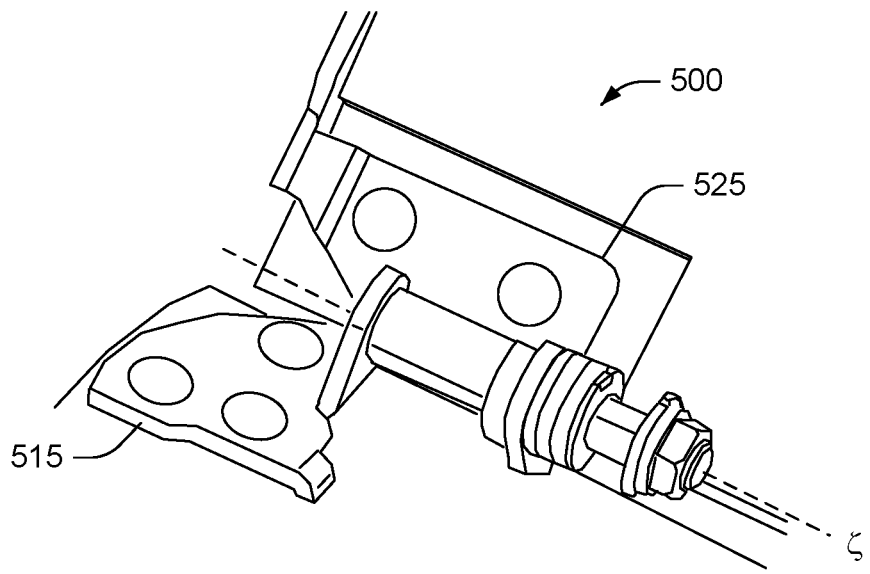
FIG. 5A and FIG. 5B are a series of diagrams of an example of a hinge assembly.
Figure 5B:
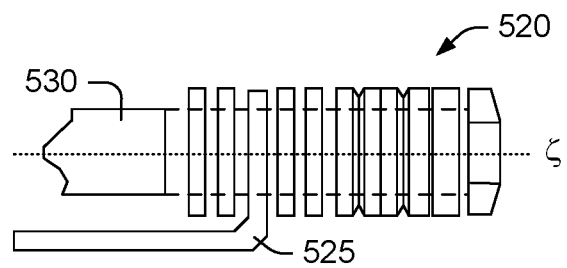

FIG. 5A and FIG. 5B show an example of a hinge assembly 500 that includes a saddle 515 and a saddle 525 with respect to a hinge post 530 and various components 520. The components 520 may include a screw nut, a dowel plate, disk type leaf springs, packing, etc. As an example, the hinge assembly 500 may include one or more friction elements to form a friction hinge assembly. As an example, the hinge assembly 500 may include permanent magnets such as the permanent magnets of FIG. 3A and FIG. 3B, FIG. 4A and FIG. 4B, etc. In such an approach, a desired amount of friction may be introduced, which may be for ergonomic purposes, for example, to provide a user with a particular amount of resistance to movement of a housing with respect to another housing; noting that the friction introduced can be substantially less than a friction required to counteract a lever arm under the acceleration of gravity. In such an approach, an amount of friction may be a "feel" friction for ergonomic reasons rather than a holding friction for static reasons. As an example, a system can include one or more permanent magnet hinge assemblies and one or more friction hinge assemblies or one or more hybrid hinge assemblies (e.g., permanent magnets with one or more friction elements).

Figure 6A:
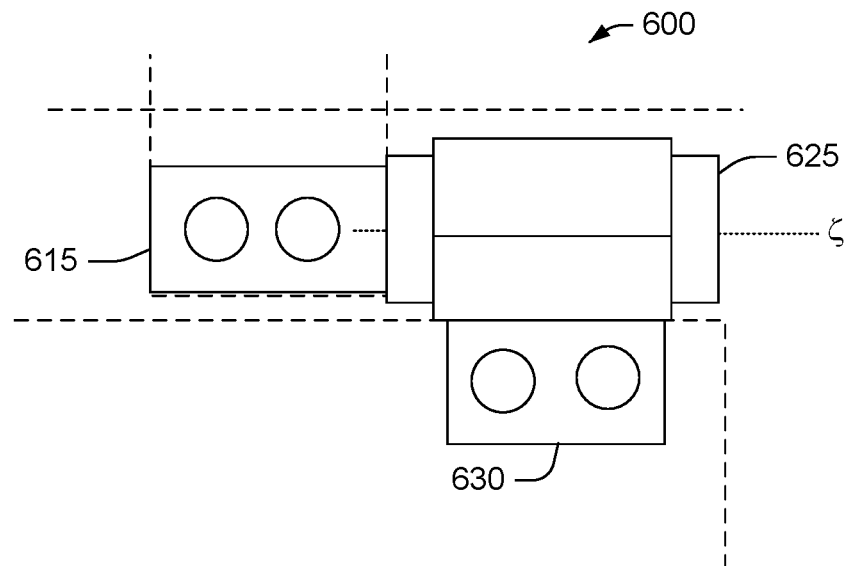
FIG. 6A and FIG. 6B are a series of diagrams of an example of a hinge assembly.
Figure 6B:
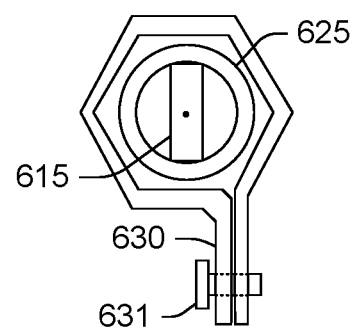

FIG. 6A and FIG. 6B show an example of a hinge assembly 600 that includes a hinge post 625 along with connector portions 615 and 630, where dashed lines indicate some example housings or housing couplings. In the example hinge assembly 600, permanent magnets may be included along with one or more friction elements. The hinge assembly 600 may be a permanent magnet hinge assembly, a friction hinge assembly or a hybrid hinge assembly. As shown in the example of FIG. 6A and FIG. 6B, one or more bolts 631 and/or one or more other types of components may be utilized to secure a connector portion and a housing, a base, etc., such that a hinge assembly can rotatably couple a housing to another housing, to a base, etc. As an example, a component may provide for adjustment of a portion of a hinge assembly, for example, consider clamping where a clamping force may be adjusted.

In various examples, a hinge assembly can include a connector portion that is a leaf (e.g., a hinge leaf), which can rotate a number of degrees around an axle (e.g., a pin) and may be an extension of a knuckle (e.g., integral, attached, etc.), where a knuckle can form a hollow part at a joint of a hinge (e.g., a hinge bore) in which an axle (e.g., a pin) is received. As an example, the saddle 515 can be a leaf, the saddle 525 can be a leaf, the connector portion 615 can be a leaf, and/or the connector portion 630 can be a leaf.

As explained, a hinge assembly can be a friction hinge assembly where one or more components can provide for adjustment of friction force. In the example of FIGS. 5A and 5B, various components may be disposed about a portion of an axle and adjustably tightened or loosened to adjust friction force. In the example of FIG. 6A and FIG. 6B, the connector portion 630 may be configured as a clamp such as a wrap strap where a single piece of material is shaped with a bore portion and tab ends where the tab ends can be brought close together to reduce a diameter of the bore portion. In such an example, each of the tab ends can include an opening through which a bolt or another type of component is passed that can be utilized to secure the connector portion 630 to a housing (e.g., or a base, etc.) and/or to adjust friction force.

As explained, a system can include a magnetic hinge assembly and may include another type of hinge assembly. For example, consider a left side magnetic hinge assembly and a right side guide hinge assembly, which may be relatively frictionless (e.g., low friction) or of an adjustable or fixed friction. As another example, consider a right side magnetic hinge assembly and a left side guide hinge assembly, which may be relatively frictionless (e.g., low friction) or of an adjustable or fixed friction. In such examples, a guide hinge assembly may be provided to help guide rotation of a housing. As yet another example, consider a magnetic hinge assembly disposed between two guide hinge assemblies (e.g., left and right guide hinge assemblies). In such an example, the magnetic hinge assembly may provide a restoring torque while the guide hinge assemblies provide for alignment (e.g., along an axis). In such an example, the magnetic hinge assembly may be contactless where an axle (e.g., a shaft) is rotatably supported by both of the guide hinge assemblies. In such an approach, the support provided by the bushings or bearings 361 and 362 with respect to the casing 330 and the axle 350 in the example of FIG. 3B may be provided by the guide hinge assemblies.

Figure 7:
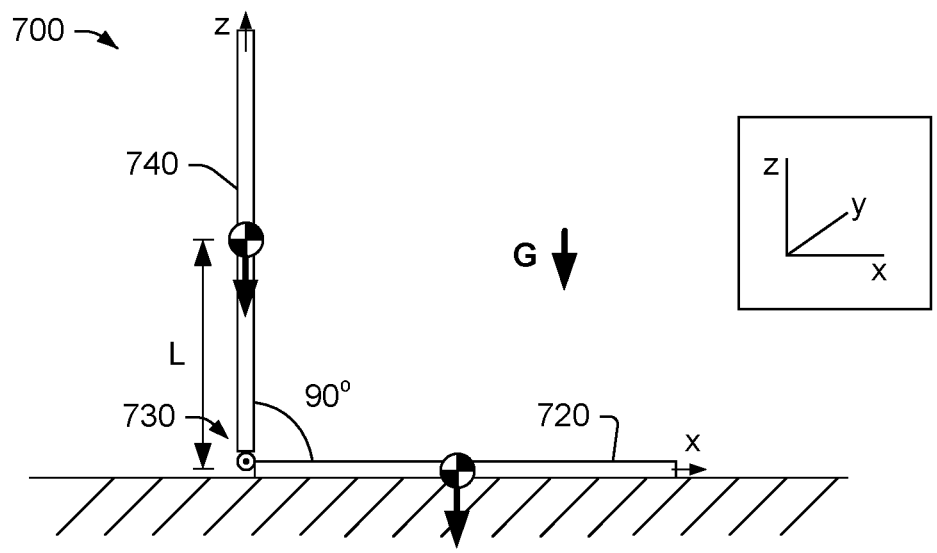
FIG. 7 is a series of diagrams of an example of a system and an example of a method for transitioning the system.
Figure 7:
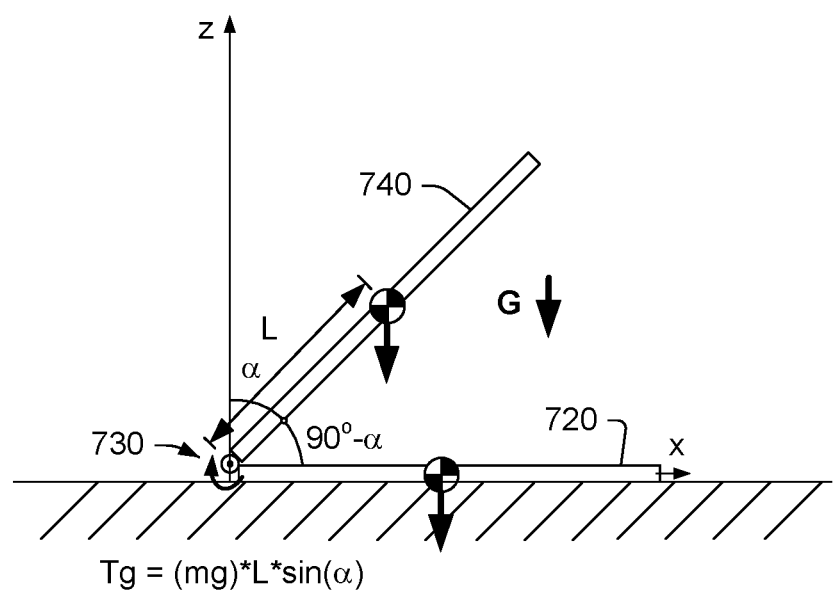
Figure 7:
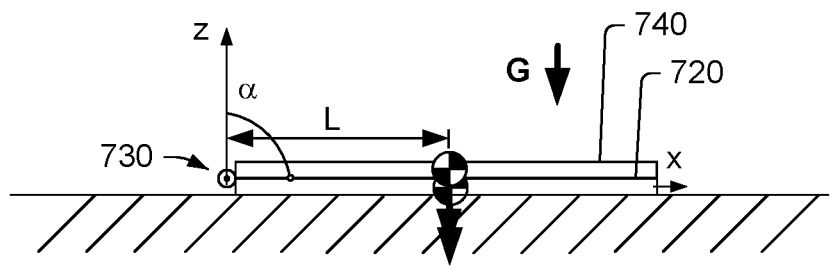

FIG. 7 shows an example of a system 700 that includes housings 720 and 740 rotatably coupled via a hinge assembly 730. In the example of FIG. 7, center of mass (e.g., which may correspond to a center of gravity of a housing) symbols are shown where, for the housing 740, a length L is shown as a lever arm length. In FIG. 7, an equation is given for gravity related torque Tg as follows:

$$Tg=(mg)*L*\sin(\alpha)$$

In the foregoing equation, m is the mass of the housing 740 and $\alpha$ is an angle measured from vertical, where the housing 720 is supported on a horizontal surface. As shown, in the top orientation, torque is zero as the angle $\alpha$ is 0 degrees such that the lever arm is aligned with gravity; whereas, in the bottom orientation, torque is at a maximum as the housing 740 is horizontal and substantially parallel with the housing 720, which may correspond to the angle $\alpha$ being approximately 90 degrees. In the middle orientation, the angle $\alpha$ is between 0 and 90 degrees such that the term $\sin(\alpha)$ is neither zero nor unity where torque due to gravity can be approximated by the foregoing equation.

As an example, in a closed orientation (bottom orientation in FIG. 7), one or more magnets may be utilized to help maintain the system 700 in the closed orientation. For example, consider a magnet in the housing 720 and a ferromagnetic material in the housing 740 that align in the closed orientation such that a magnetic attraction force is established, which may help avoid undesirable opening of the housings (e.g., during transport, etc.). Such a magnetic attraction force may be relatively small and overcome by manual force such as, for example, a force applied by a fingertip to lift the housing 740 away from the housing 720. Once the housing 740 is rotated a small distance away from the housing 720 (e.g., an arc distance corresponding to a few degrees of rotation such as, for example, 3 to 5 degrees $\Phi$), the magnetic attraction force can be sufficiently weak and negligible. When a user wants to transition the system to the closed orientation, the user can move the housing 740 toward the housing 720 where, at the relatively small distance, the magnetic attraction force can "take over" and transition the system to the closed orientation, which may be considered a closed and secured orientation. As an example, a "snap" action or a more viscous, damped action may occur for angles of $\Phi$ less than approximately 10 degrees. Such an action may occur at an angle that is deemed to be an indicator angle that a user wants to transition the system to a closed orientation rather than merely an out-of-view angle of a display (e.g., such that others do not see screen content). As an example, a magnetic attraction force may commence at an angle that corresponds to a trigger angle of a system for transitioning a system to a lower power state (e.g., a sleep state, a shutdown state, etc.). In such an example, a greater angle may indicate that a user merely wants to hide a display from view without necessarily making a power state transition.

Figure 8:
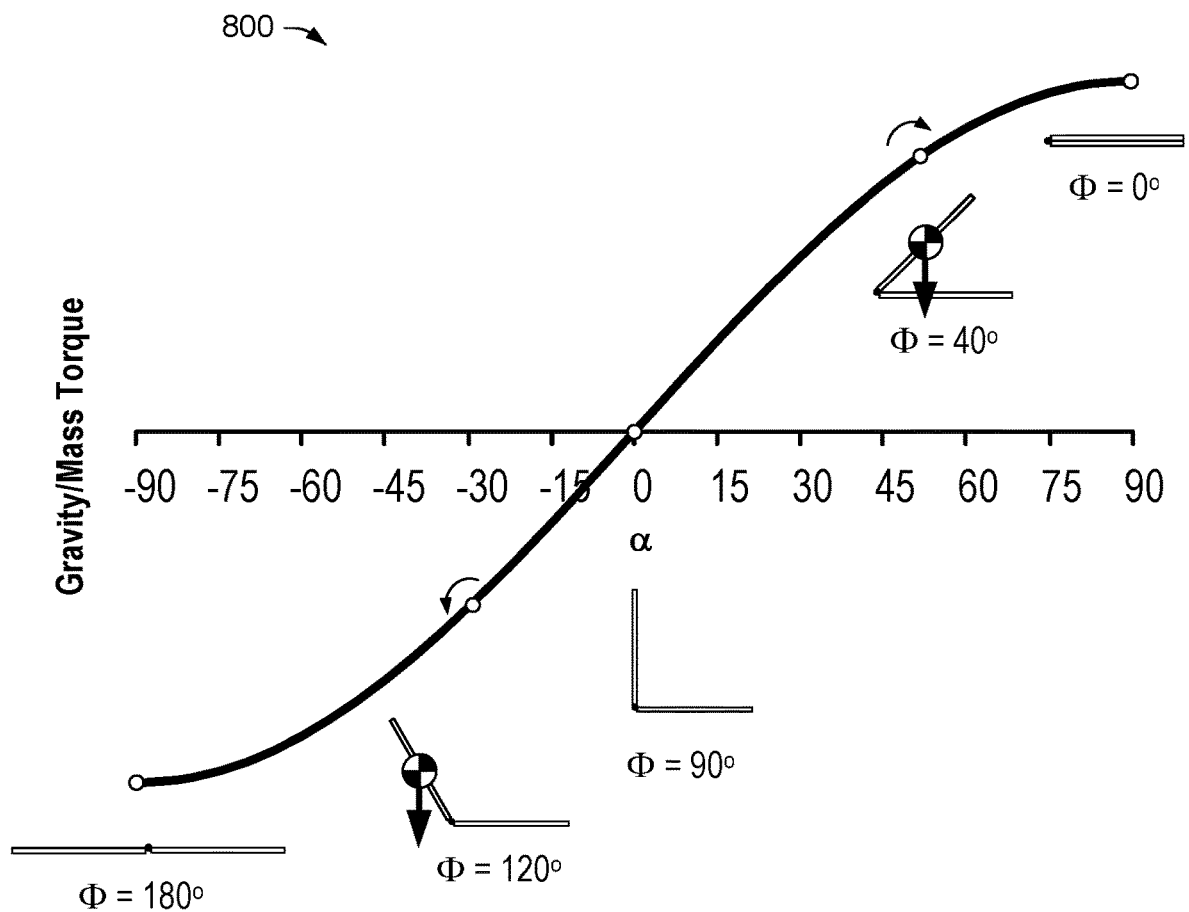
FIG. 8 is a diagram of an example plot.

FIG. 8 shows an example plot 800 of gravity or mass torque versus angle $\alpha$ over a range from $-90$ degrees to $+90$ degrees. Example system graphics are also illustrated showing values of an angle $\Phi$ where one of the two housings remains horizontal. In the example of FIG. 8, the plot 800 shows torque that is sinusoidal in shape with respect to angle. For example, the torque may be represented using a sine function, as mentioned with respect to FIG. 7.

Figure 9:
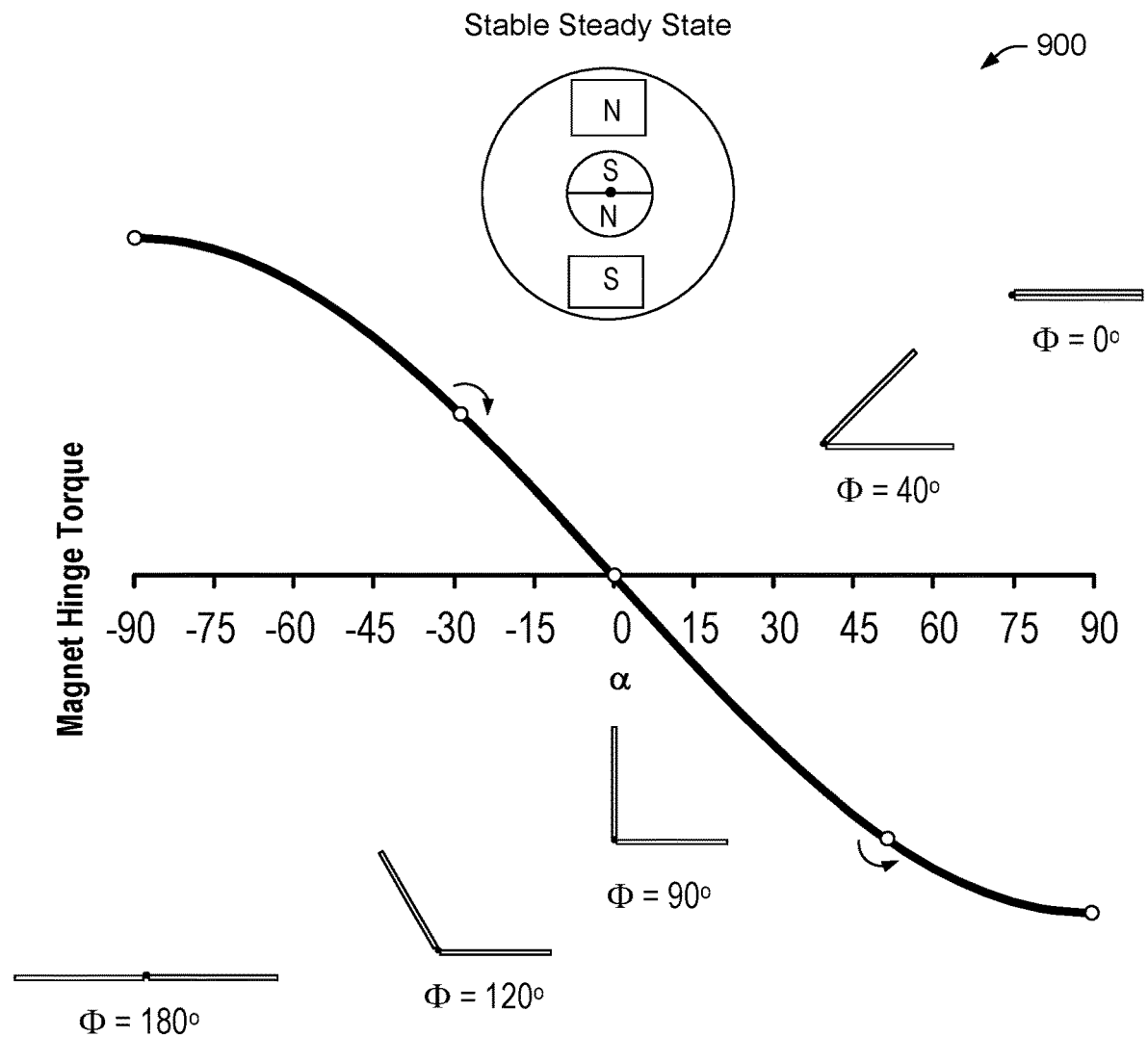
FIG. 9 is a diagram of an example plot.

FIG. 9 shows an example plot 900 of magnetic torque versus angle $\alpha$ over a range from $-90$ degrees to $+90$ degrees. As indicated, 0 degrees corresponds to a stable steady state. Example system graphics are also illustrated showing values of an angle $\Phi$ where one of the two housings remains horizontal. In the example of FIG. 9, the plot 900 shows torque that is sinusoidal in shape with respect to angle. For example, the torque may be represented using a sine function where a restoring torque is clockwise over a range of angles and where a restoring torque is counterclockwise over a range of angles.

Figure 10:
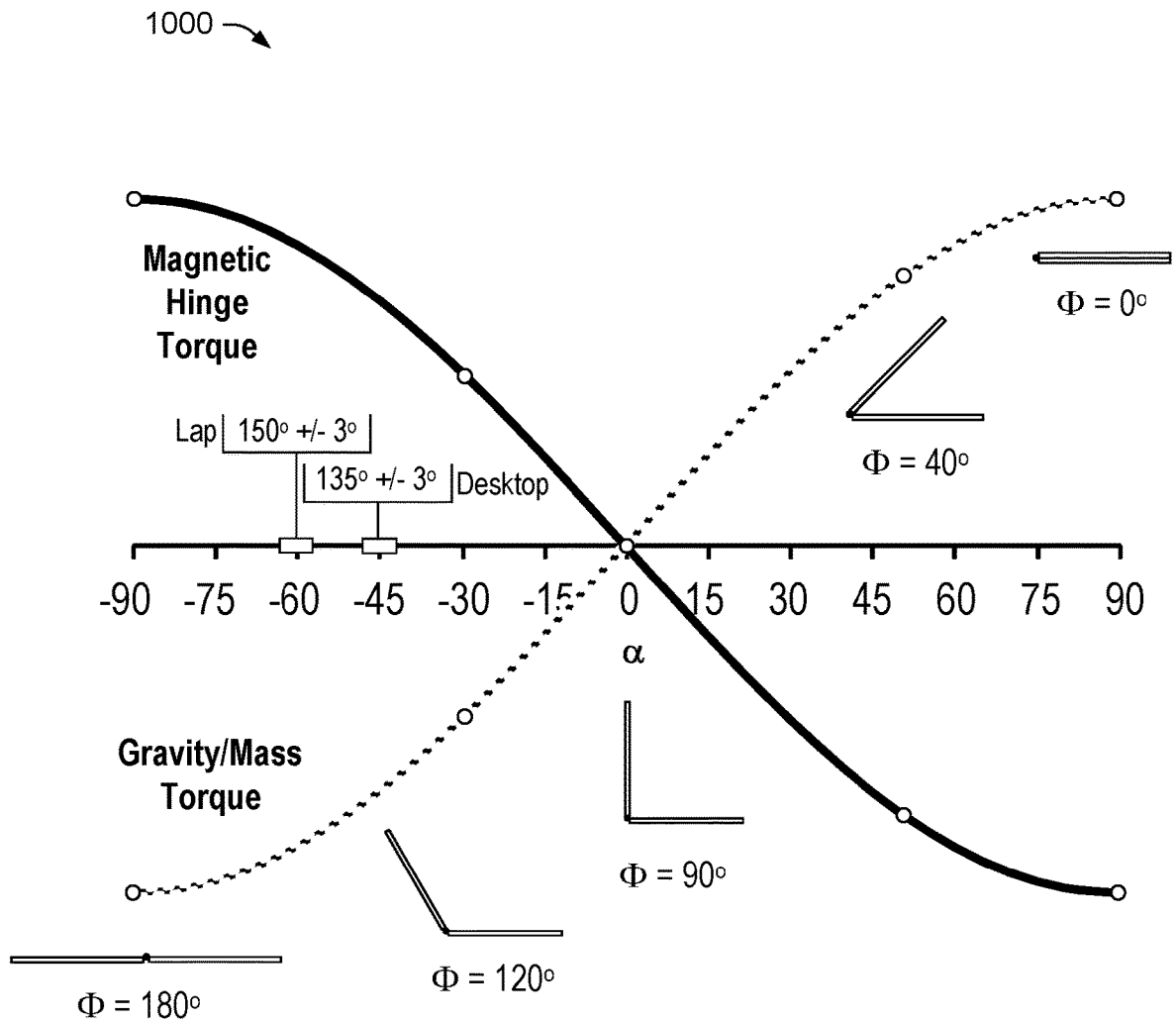
FIG. 10 is a diagram of an example plot.

FIG. 10 shows an example plot 1000 of magnetic torque and gravity or mass torque versus angle $\alpha$ over a range from $-90$ degrees to $+90$ degrees. As indicated, $\alpha$ equal to 0 degrees corresponds to a stable steady state. As shown, the torques can, at least theoretically, cancel. Example system graphics are also illustrated showing values of an angle $\Phi$ where one of the two housings remains horizontal. As explained with respect to FIG. 2, in such an approach, a user may adjust an angle between housings (e.g., the angle $\Phi$) using an extremely light touch.

As an example, a system may include a hinge assembly that is operable over a range of angles with a magnetic related torque (e.g., a restoring torque). For example, consider a range of angles that includes angles less than $\alpha=0$ and that includes angles greater than $\alpha=0$. For example, consider $-75$ degrees to $+75$ degrees, $-60$ degrees to $+60$ degrees, $-45$ degrees to $+45$ degrees, $-30$ degrees to $+30$ degrees, etc. As an example, a magnetic related torque (e.g., a restoring torque) can be sinusoidal in that it can form a portion of a sine function (e.g., plotted versus angle).

As an example, touch may be quantified in newtons, which may be at a level of centi-newtons (cN). For example, a keyboard that has a rather higher actuation force may be rated at 50 cN. As an example, an adjustment force may be of the order of tens of centi-newtons or, optionally, less than 10 cN.

As an example, a housing may be adjustable according to various types of forces, which can include one or more of a preload, a tactile force and an actuation force. As to keyboards, preload is the force required to begin depressing a key. This force arises from partial compression of the spring by the switch at rest: when a switch is assembled, the spring may be compressed by a certain amount by the space inside the switch being shorter than the spring. Preload can be seen by a force curve having a force intercept greater than zero. Preload can help to prevent a key from having a loose, slack feel, especially for people who rest their fingers on the keys. Tactile force, for tactile switches (e.g., including clicky but not linear switches), is the force required to overcome a tactile peak in a force curve. This force may be mechanically unrelated to operation of switch contacts and serve to provide feedback to an operator. Switch actuation may be intended to occur just after this point, when the force level drops off, using the momentum gained to propel a slider forward to an actuation point. As to actuation force, it is the force required to actuate a switch (e.g., to cause it to register a key press). In linear switches, it can set an amount of pretravel required (e.g., how far the switch must be pressed for it to register). In various instances, tactile force can exceed actuation force; noting that linear switches have no notion of tactile force.

As an example, a system can include a keyboard with keys rated according to one or more forces, which can include an actuation force. As an example, a system can include one or more magnetic hinge assemblies that rotatably couple two housings where an adjustment in angle between the two housings can be achieved using a force that is less than the actuation force of keys of a keyboard of the system (e.g., where one of the housings is a keyboard housing and the other housing is a display housing where the force is an adjustment force to adjust the display housing where the keyboard housing remains stationary). In such an example, the system itself can demonstrate whether or not the adjustment force is less than the actuation force.

Figure 11:
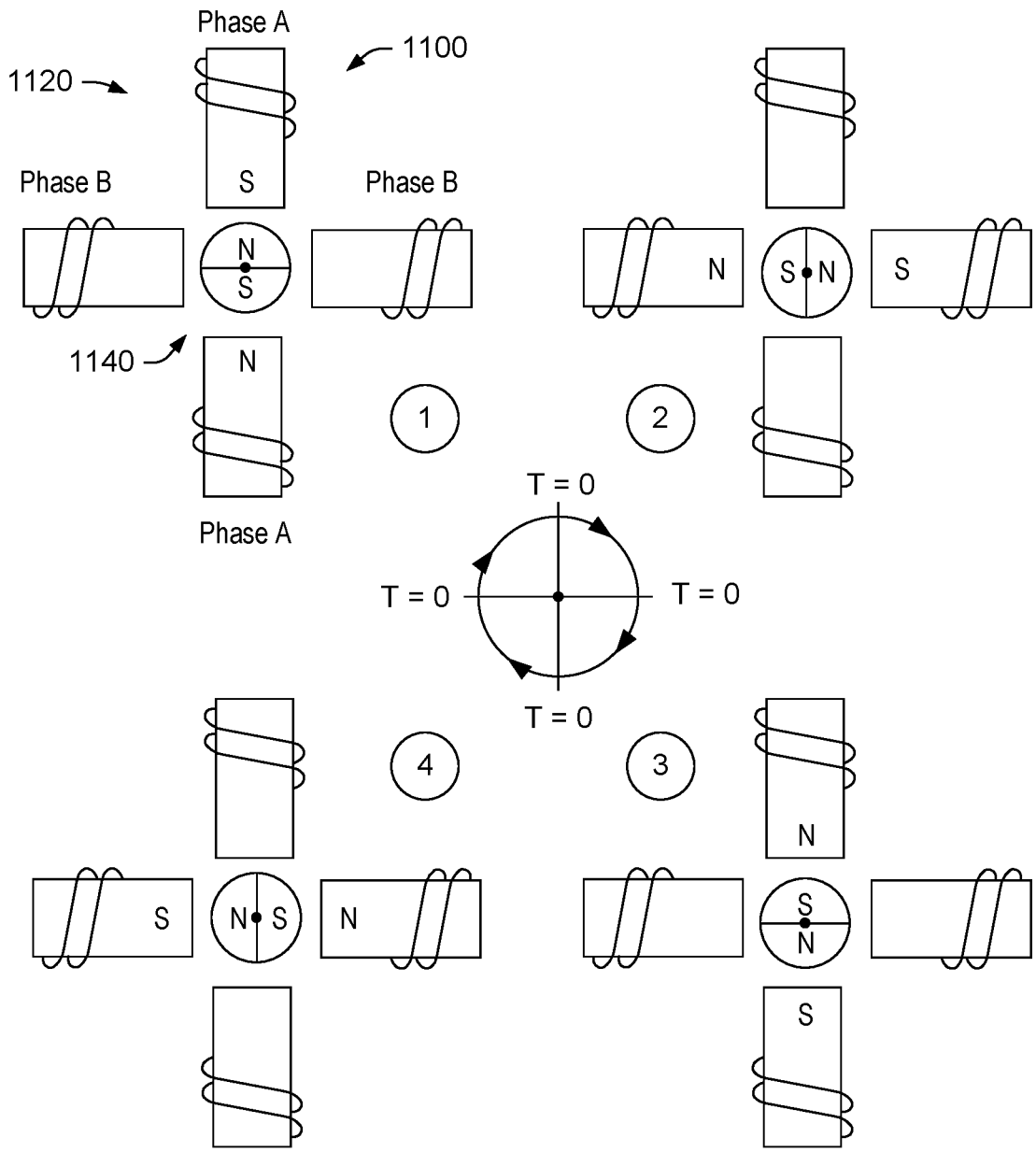
FIG. 11 is a diagram of an example of a two-phase stepper motor.

FIG. 11 shows an example of a two phase (phase A and phase B) stepper motor 1100 with a stator 1120 and a rotor 1140 where phase A or phase B may be activated to cause the rotor 1140 to rotate. As shown, the rotor 1140 can be a permanent magnet that can be rotated at 90 degree increments in a clockwise direction.

Figure 12A:
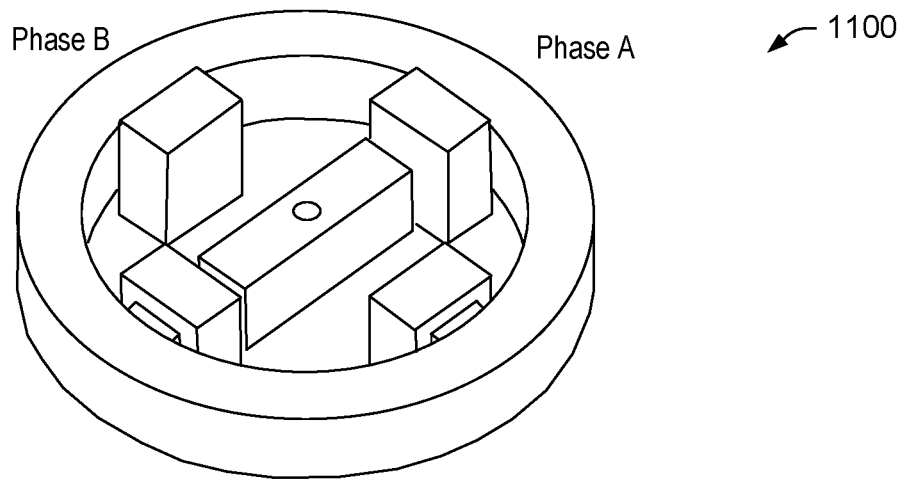
FIG. 12A and FIG. 12B are a series of diagrams of an example of a two-phase stepper motor and an example plot.
Figure 12B:
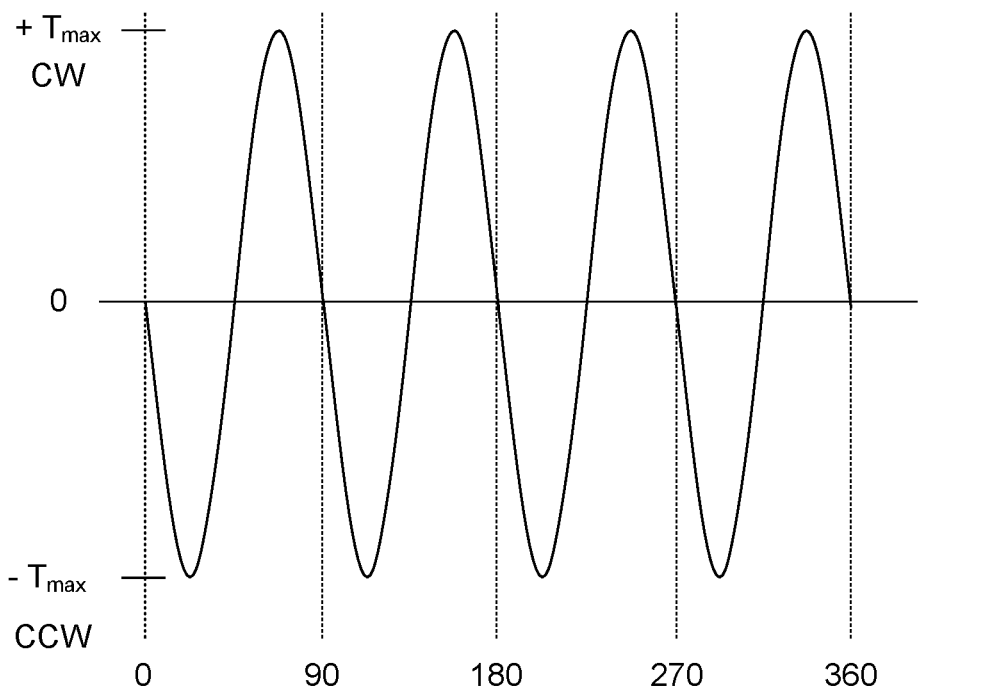
Figure 13A:
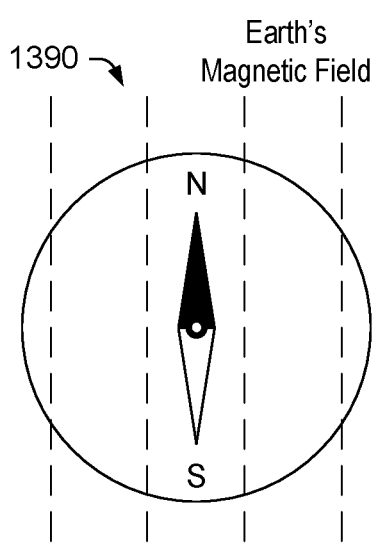
FIG. 13A, FIG. 13B and FIG. 13C are a series of diagrams of an example of a system and examples states.
Figure 13A:
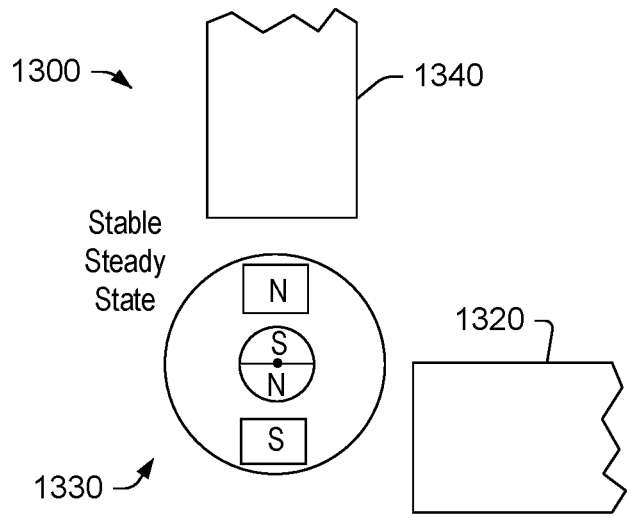
Figure 13B:
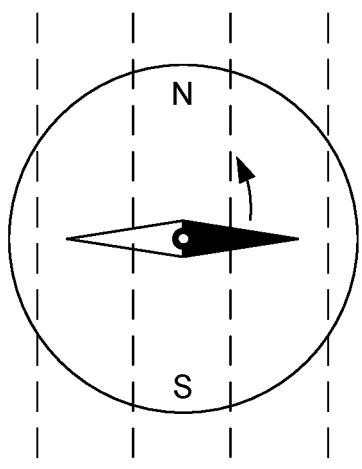
Figure 13B:
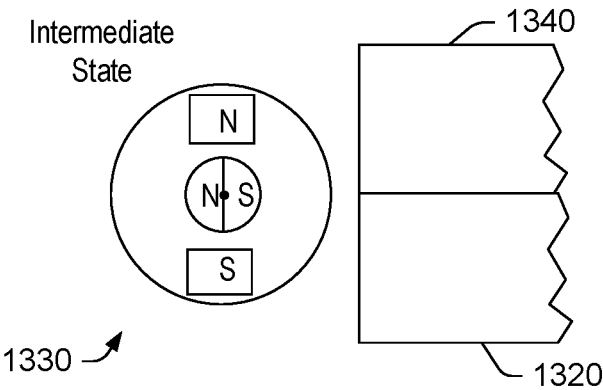
Figure 13C:
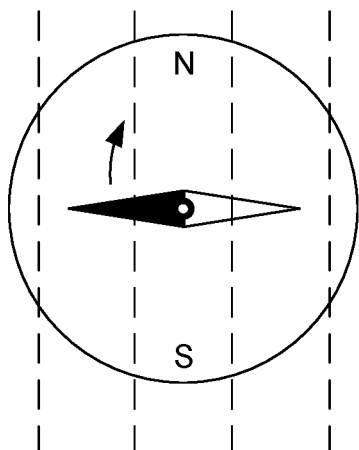
Figure 13C:
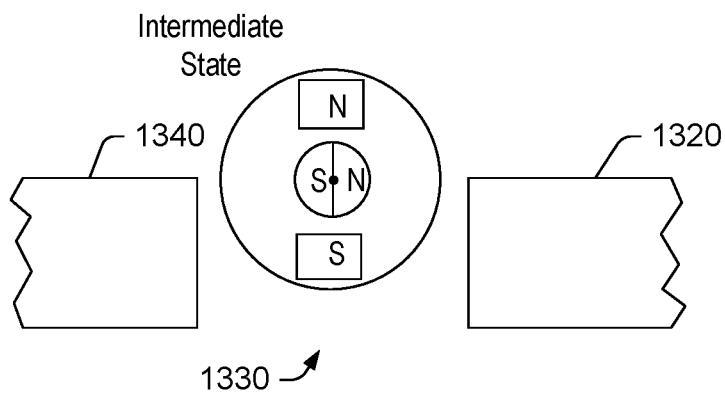

FIG. 12 shows another view of the stepper motor 1100 along with a plot 1200 of no current torque, which may be referred to as cogging torque or detent torque. Such torque can be detrimental to operation of a stepper motor. As shown in the plot 1200, for the two phase stepper motor 1100, the no current torque exhibits a sine function with a full cycle every 90 degrees. Operation of a stepper motor must account for such no current torque, which can be detrimental to operation; noting that a stepper motor is generally intended to be operable in any orientation with respect to gravity.

FIG. 13 shows an example of a system 1300 with reference to states of a compass 1390 influenced by the magnetic field of the Earth. As shown, the system 1300 includes housings 1320 and 1340 rotatably coupled by a hinge assembly 1330. As to the compass 1390, it is shown in a north pointing stable steady state of the compass needle, an east pointing intermediate state of the compass needle where magnetic force urges the needle counterclockwise toward the north pointing stable steady state (e.g., a restoring force) and a west pointing intermediate state of the compass needle where magnetic force urges the needle clockwise toward the north pointing stable steady state (e.g., a restoring force).

A compass needle can be considered to be a magnetic dipole, having a single north pole and a single south pole. A compass needle can be supported on a relatively frictionless mount or spindle such that force of the Earth's magnetic field can cause the compass needle to be in a stable steady state. In various instances, a compass needle can be floating and may be in the form of a floating needle, which may be shaped differently than a needle (e.g., a sphere, a disc, etc.). Where a compass needle is in an unstable steady state (e.g., perfectly anti-aligned with the Earth's magnetic field), a perturbation to the compass needle (e.g., clockwise or counterclockwise) will result in force acting to transition the compass needle to the stable steady state.

A compass is generally operable in a horizontal orientation where the acceleration of gravity may act upon a compass needle evenly about its extent such that the center of mass is aligned with the rotational axis of the compass needle. For example, a compass can be oriented in a plane where the acceleration of gravity is normal to the plane. However, for a compass to work properly, the compass needle must be free to rotate and align with the magnetic field, which can have a declination angle (pointing downward into the Earth). A difference between compasses designed to work in the northern and southern hemispheres can be in the location of a balance weight that is placed on the needle to ensure it remains in a horizontal plane and hence free to rotate. In the northern hemisphere, the magnetic field dips down into the Earth so the compass needle has a weight on the south end of the needle to keep the needle in the horizontal plane; whereas, in the southern hemisphere, the weight is positioned on the north end of the needle.

As explained, a compass operates under the influence of the Earth's magnetic field, which can be measured in tesla or gauss, for example, the strength of the field at the Earth's surface ranges from less than 30 microteslas (0.3 gauss) in an area including most of South America and South Africa to over 60 microteslas (0.6 gauss) around the magnetic poles in northern Canada and south of Australia, and in part of Siberia.

Figure 14:
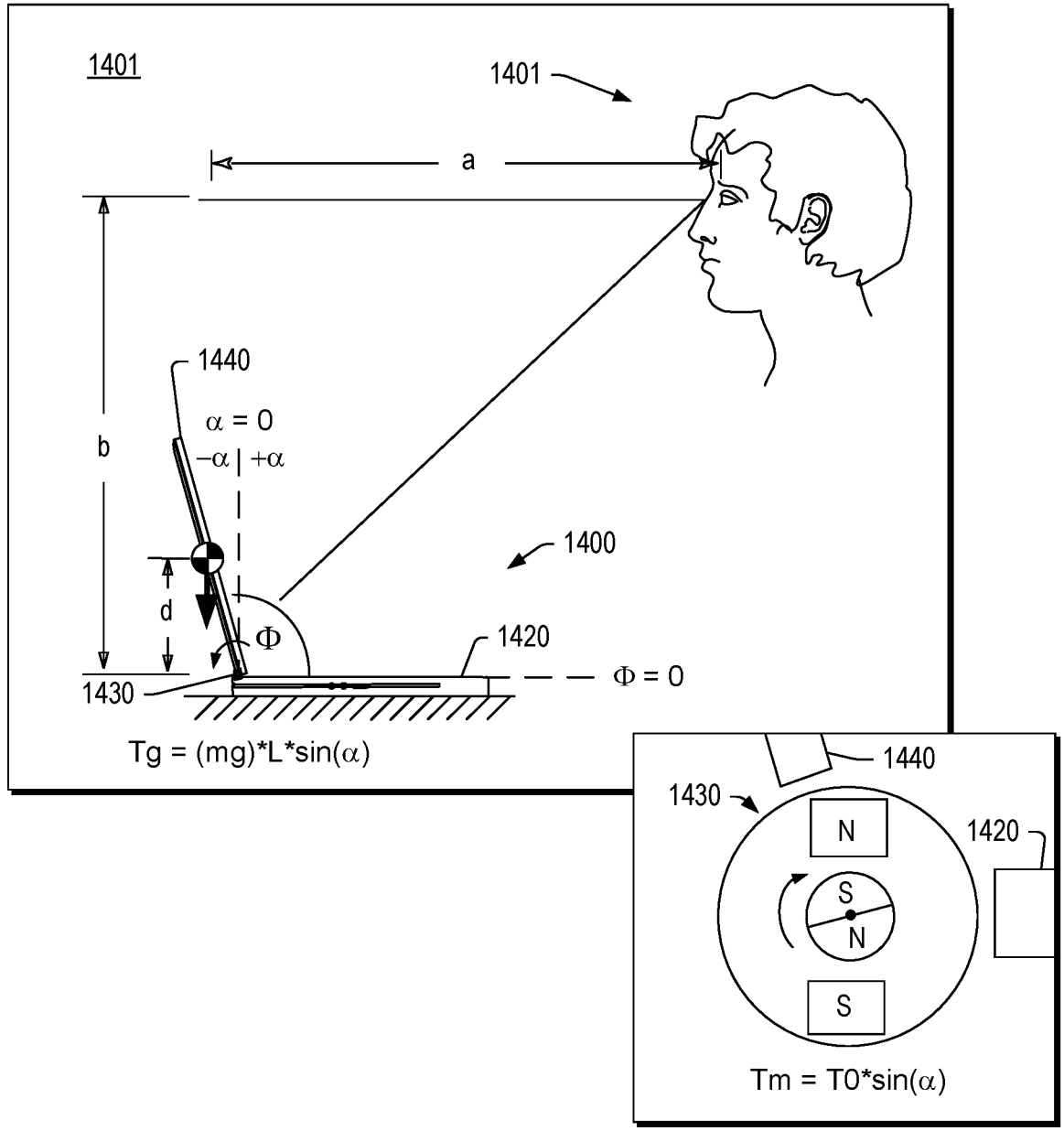
FIG. 14 is a diagram of an example of a system in an example scenario.

FIG. 14 shows an example of a system 1400 with housings 1420 and 1440 in a scenario where eyes of a user 1401 are positioned a horizontal distance a from a rotational axis of a hinge assembly 1430 and a vertical distance b above the rotational axis, where a center of mass of the housing 1440 is a vertical distance d above the rotational axis, where L, as a lever arm, can be defined as the hypotenuse of a triangle with a height equal to the vertical distance d. In the example of FIG. 14, the hinge assembly 1430 can include permanent magnets where a dipole is tilted at an angle within a primary field such that the hinge assembly 1430 counteracts at least a portion of the gravity related torque of the housing 1440 about the rotational axis.

As shown in FIG. 14, the gravity torque can depend on mass, m, gravity, g, lever arm, L, and sine of the angle $\alpha$ while the magnetic torque can depend on a torque TO and sine of the angle $\alpha$, where the gravity torque and the magnetic torque can be opposite in directions about an axis of a hinge assembly such that the magnetic torque acts as a restoring torque that counteracts the gravity torque. As an example, where the angle $\alpha$ is 90 degrees, $\sin(\alpha)$ equals one. For a balanced arrangement, TO can be equal to the product mgL (e.g., where m and L may be fixed and constant) but in an opposite direction about an axis of a hinge assembly.

As explained, a stable steady state of permanent magnets can be set to a position where gravity torque is zero. In such an example, the permanent magnets of a hinge assembly may define two dipoles, akin to the Earth's dipole and the dipole of a needle of a compass, where the two dipoles are within a concentric cylinder type of arrangement aligned along a common axis where an outer cylinder and/or an inner cylinder may rotate about the common axis to be in a stable steady state or in an intermediate state and, for example, depending on arrangement, an unstable steady state.

As explained with respect to FIG. 2, a user such as the user 1401 of FIG. 14 may utilize a finger (e.g., a fingertip) to adjust the angle Φ where the force applied may be relatively low, for example, less than an actuation force of a key of a keyboard such as a key of a keyboard of the housing 1420, which is shown as being positioned on a substantially horizontal surface (e.g., a desk surface, a table surface, a countertop surface, etc.).

Figure 15:
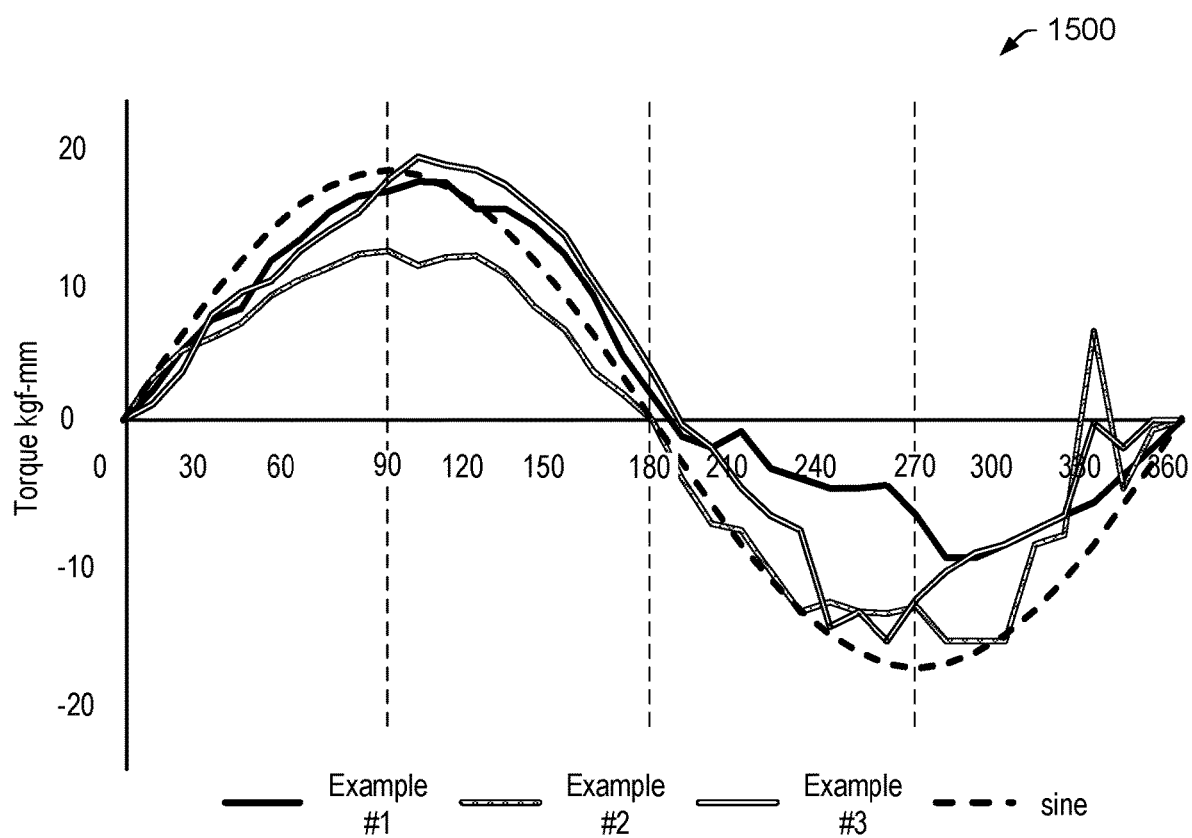
FIG. 15 is a diagram of an example plot.

FIG. 15 shows a plot 1500 of torque versus angle for three example hinge assemblies configured as shown in the example of FIG. 3A and FIG. 3B with respect to a sine function. As shown, a positive torque of approximately 20 kgf-mm and a negative torque of approximately 20 kgf-mm can be achieved for approximately 90 degree rotations from approximately 180 degrees (see, e.g., 90 degrees and 270 degrees).

Consider the example system 700 of FIG. 7 and the equation:

$$Tg=(mg)*L*\sin(\alpha)$$

If the mass of the housing 740 is 0.1 kg and the length L is 0.1 m, with an assumed acceleration of gravity of 10 m/s$^2$ then the maximum gravity related torque is approximately 0.1 N-m, which is approximately 10.2 kgf-mm (e.g., 1 N-m equals 101.97 kgf-mm). If a system includes two hinge assemblies, then each hinge assembly may be expected to handle approximately 0.05 N-m (5.1 kgf-mm). In the example of FIG. 15, two hinge assemblies rated at approximate 20 kgf-mm may be able to handle a housing with a mass of approximately 0.4 kg (e.g., approximately 0.9 lb).

As an example, a system may be configured as a clamshell computer that has dimensions of approximately 320 mm×217 mm×15 mm, with a 14 inch display, measured diagonally. In such an example, a keyboard housing can be thicker and heavier than a display housing. For example, a display housing thickness may be less than 50 percent of a keyboard housing thickness and a display housing mass may be less than 50 percent of a keyboard housing mass. In such an example, where a total thickness is 15 mm, the display housing thickness may be less than approximately 5 mm and, for example, where a total mass is approximately 1.1 kg, the display housing mass may be less than approximately 0.37 kg (e.g., approximately 0.82 lb).

As an example, one or more hinge assemblies can include permanent magnets that may be rated at a maximum torque that is greater than a gravity related torque whereby one or more friction elements may hinder movement of a housing with respect to another housing. As an example, one or more hinge assemblies can include permanent magnets that may be rated at a maximum torque that is less than a gravity related torque whereby one or more friction elements may hinder movement of a housing with respect to another housing.

As an example, one or more friction elements may be utilized to address a mismatch between a magnetic torque and a gravity related torque. In such an example, the one or more friction elements may hinder undesirable movement of a housing with respect to another housing. For example, consider undesirable movement of a housing moving toward an angle of a stable steady state of a hinge assembly or undesirable movement of a housing moving toward a low potential energy level state under the influence of gravity.

As an example, the magnetic field and torque in radially magnetized, permanent magnet couplings can be developed from the magnetic scalar potential in the air gap between a shaft and a cylinder. As mentioned, a type of torque can be a cogging torque, which can exist in some types of stepper motor that include multi-pole couplings.

As an example, magnetic couplings can transmit torque without direct mechanical contact. As an example, a radial magnetic coupling can include a shaft, fitted with a circular array of permanent magnet arc segments, which is separated by an air gap from a similar array of permanent magnet arc segments attached to a bore of a cylinder. In such an example, the magnetization of each arc segment may be assumed to be in a purely radial direction, either positive or negative, with the number and arrangement determining the number of poles in the coupling.

In the case of axial magnetic couplings, closed-form expressions for the force and torque have been derived from the magnetic vector potential obtained by solving Laplace's and Poisson's equation for a two-dimensional (2D) analytical model. As set forth herein, magnetic field and torque in radially magnetized couplings can be derived from a two-dimensional analytical model. Exact closed-form expressions can be obtained by solving Poisson's equation for the magnetic scalar potential in the permanent magnet regions and Laplace's equation in the air gap region.

Figure 16:
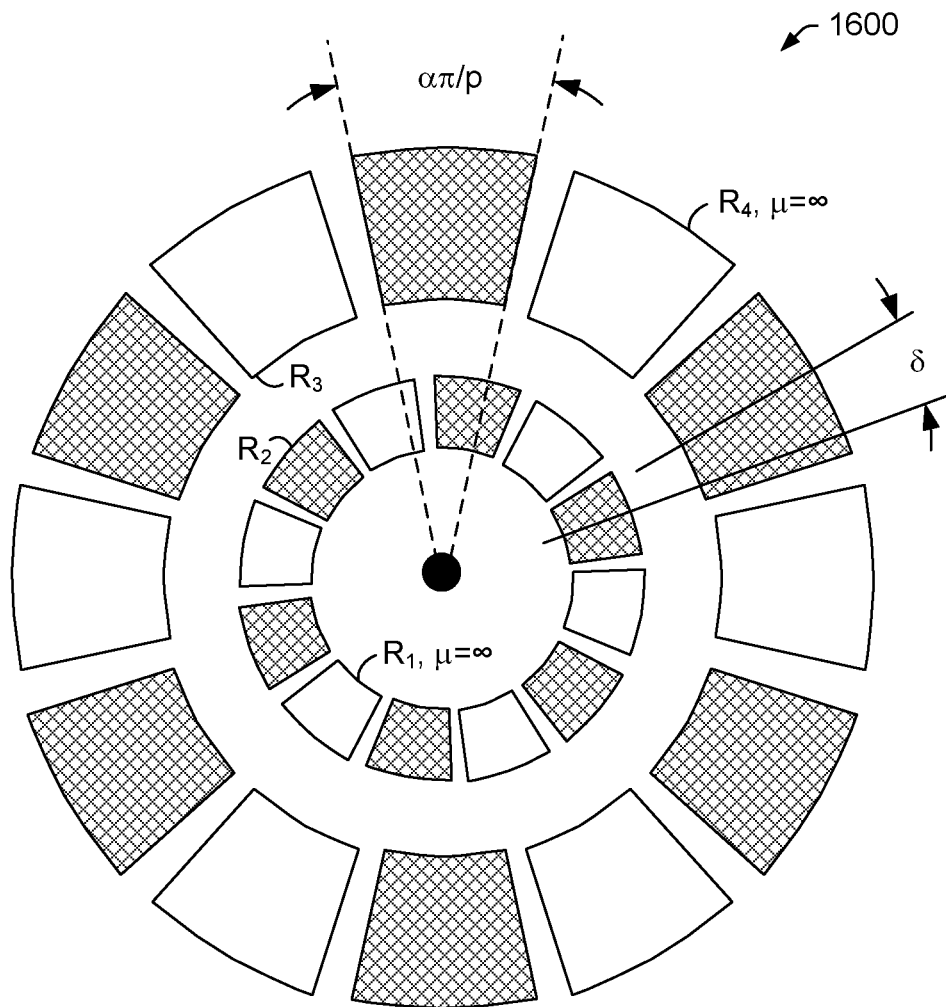
FIG. 16 is a diagram of an example of a multi-pole assembly.

FIG. 16 shows an example of a cross-section of an ideal, radially magnetized coupling 1600. As shown, a circular array of permanent magnet arc segments extends radially to radius $R_2$, from a shaft of radius $R_1$. An air gap separates a corresponding array of permanent magnet arc segments attached to the bore of a cylinder with bore radius $R_4$. The air gap radial clearance is $R_3-R_2$. The pole arc to pole pitch ratio is denoted by α, where the number of poles is p (p=6). The shaft and housing have infinite permeability (μ=∞, at $r=R_1$ and $R_4$). In FIG. 16, δ is an angular offset (torque angle) used as a parameter in the torque expression.

The alternating hatched and non-hatched segments denote alternating positive and negative radial directions of magnetization in each of the adjacent arc segments. With integer p denoting the number of pole pairs, as mentioned, the example of FIG. 16 shows a p=6 pole-pair, radial, magnetic coupling. The cylinder is assumed to be sufficiently long and losses due to end effects and fringing negligible.

As to a two-dimensional analysis, the following assumptions are made: an iron shaft and cylinder have infinite magnetic permeability (μ=∞); and the radially magnetized permanent magnets have relative recoil permeability ($μ_r$=1; reasonable for the neodymium-iron-boron (NdFeB) magnets which have $μ_r$~1.05).

An analysis domain can be separated into three regions: region 1 is the region occupied by permanent magnets attached to the shaft, $R_2 \leq r \leq R_1$; region 2 is the air gap region, $R_3 \leq r \leq R_2$, and region 3 is occupied by the outer constellation of permanent magnets, $R_4 \leq r \leq R_3$. The magnets of region 3 are shown rotated by angle δ (torque angle) relative to the magnets in region 1. From the geometry, the magnetic field distribution is periodic with period T=2π/p.

The constitutive law relating the magnetic flux density vector, B, to the magnetic field intensity vector, H, and the magnetization vector, M, in the permanent magnet regions is:

$$B=\mu(H+M) \quad (1)$$

where $\mu=4\pi\times10^{-7}$ henrys/meter, is the permeability of space.

Derived closed-form expressions can be utilized for one or more purposes. For example, consider computations on a radially magnetized, multi-pole coupling, with parameters given in Table 1 below.

TABLE 1

| Item | Description | Value |
| --- | --- | --- |
| $R_1$ | Inner radius of shaft magnets | $1.5 \times 10^{-3}$ m |
| $R_2$ | Outer radius of shaft magnets | $3.0 \times 10^{-3}$ m |
| $R_3$ | Inner radius of cylinder magnets | $3.25 \times 10^{-3}$ m |
| $R_4$ | Outer radius of cylinder magnets | $5 \times 10^{-3}$ m |
| L | Axial length of magnets | $37 \times 10^{-3}$ m |
| $B_r$ | Residual flux density, N52 magnet | 1.44 Tesla |
| α | Pole arc to pole pitch ratio | 0.9 |
| p | Number of pole-pairs | variable |

Torque calculations may be performed by taking a contour in an air gap with radius equal to a mean radius. Table 2 shows the amplitude of the cogging torque per unit length, computed from torque expressions, for different number of pole-pairs as well as the contribution of the first four terms of k included in the summation.

TABLE 2

| | Number of pole pairs, p | | | | | |
| --- | --- | --- | --- | --- | --- | --- |
| Index, k | 1 | 2 | 3 | 4 | 5 | 6 |
| 1 | 15.95 | 24.60 | 27.33 | 27.27 | 26.08 | 24.48 |
| 3 | 1.76 | 2.21 | 1.76 | 1.39 | 1.09 | 0.86 |
| 5 | 0.11 | 0.37 | 0.25 | 0.17 | 0.11 | 0.07 |
| 7 | 0.07 | 0.06 | 0.03 | 0.02 | 0.01 | 0.01 |
| Σ(T/L)= | 17.89 | 27.24 | 29.37 | 28.85 | 27.29 | 25.42 |

The sum converges rapidly and even a single term (k=1) approximation can yield a sufficiently accurate estimate for a preliminary sizing study. Within the range examined for this coupling, the maximum cogging torque that could be achieved is 29.37 N-m per meter of axial length of the magnet segments.

Figure 17:
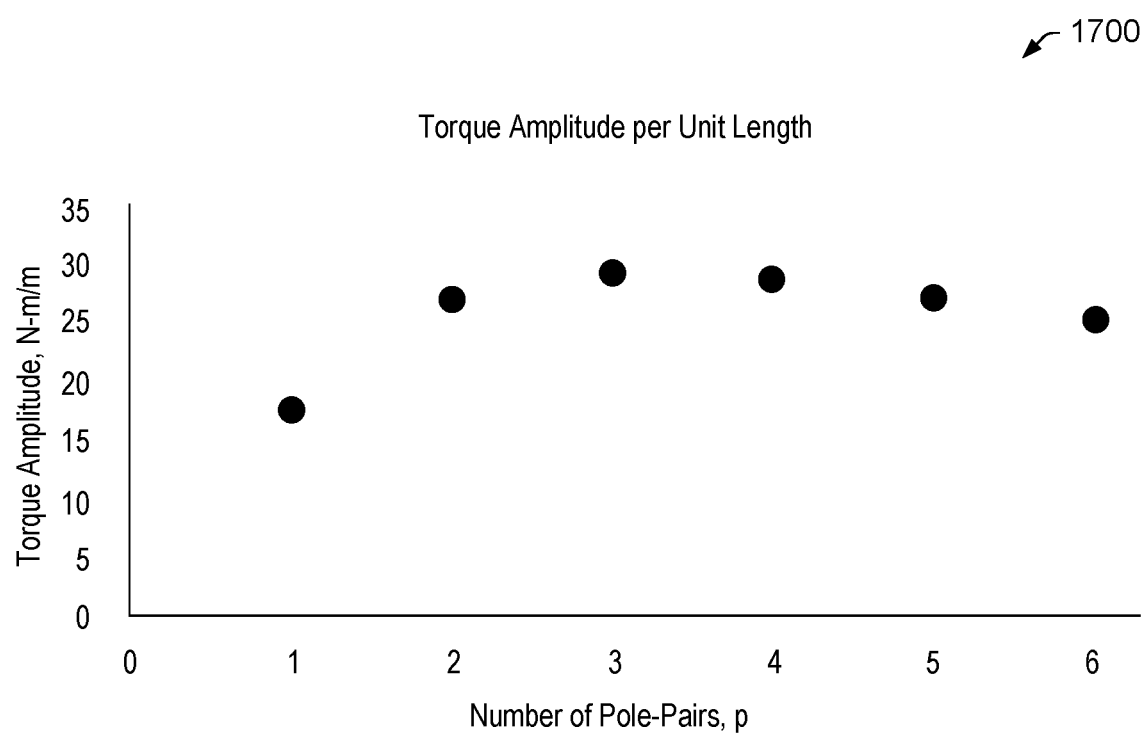
FIG. 17 is a diagram of an example plot.

FIG. 17 shows an example plot 1700 that includes torque versus pole-pair number, p, where a maximum cogging torque corresponds to a 3 pole-pair design.

Torque measurements were taken on several couplings. The magnet segments were constructed from N52 (NdFeB) magnets and samples correspond to the 6 pole-pair geometry of Table 1. Neodymium magnets may be graded according to maximum energy product, which relates to the magnetic flux output per unit volume where higher values indicate stronger magnets. For sintered NdFeB magnets under an international classification scheme, values tend to range from 28 up to 52 (e.g., N28 to N52). In such a scheme, the first letter N before the values is short for neodymium (e.g., sintered NdFeB magnets) and one or more letters that follow the values can indicate intrinsic coercivity and maximum operating temperatures (e.g., positively correlated with the Curie temperature), which may range from default (e.g., up to 80° C. or 176° F.) to AH (e.g., 230° C. or 446° F.). The steel shaft and housing are constructed of SUS403 (e.g., consider chemical composition of C at max. 0.15, Si at max. 0.5, Mn at max. 1.00, P at max. 0.04, S at max. 0.03, Ni at max. 0.6, and Cr at 11.5-13.0). The magnet arc segments are magnetized diametrically (e.g., in a uniform direction) rather than in a truly radial direction. Such an approach can be utilized rather than directly producing a radial magnetization field. As an example, as the number of arc segments increases, the field will better approximate a true radial field.

Figure 18:
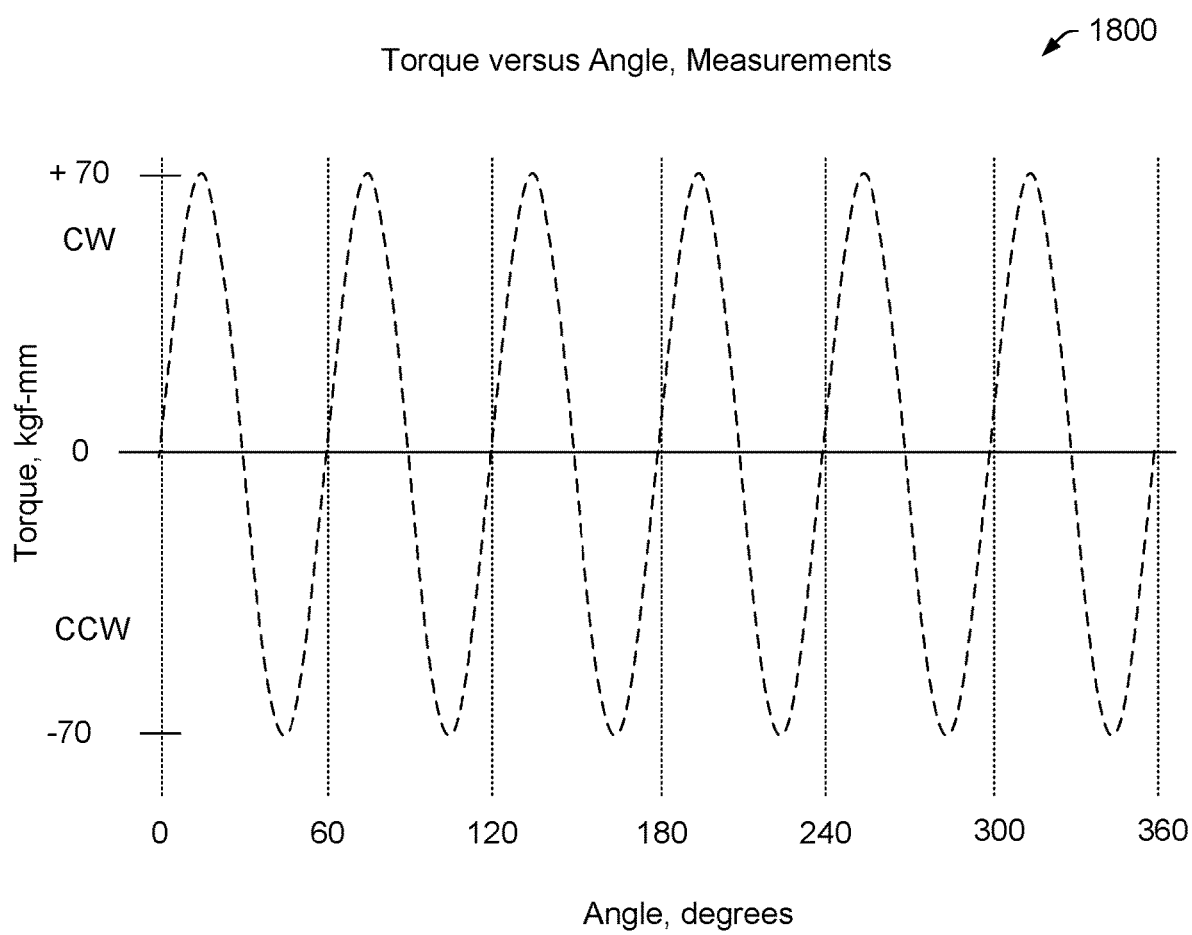
FIG. 18 is a diagram of an example plot.

FIG. 18 shows an example plot 1800 that represents the torque measurements using a single sine function. Measurements were made in both clockwise and counter-clockwise directions and cover one full revolution of the shaft. The average amplitude was approximately 70 kgf-mm. From Table 2, the predicted amplitude of the cogging torque for an ideal, radially magnetized, 6 pole-pair coupling with this geometry would be 95.9 kgf-mm. The prediction may be adjusted and brought into better correlation with the experimental measurements by replacing the value of $B_r$ with a reduced value $B_0$.

The scalar potential for multi-pole, radially magnetized couplings have been derived from the solution of Poisson's equation in the permanent magnet regions, and Laplace's equation in the air-gap region. All field quantities of interest can be obtained from the scalar potentials. In particular, the closed-form expression for the cogging torque is developed, which shows sinusoidal behavior. The theoretical prediction for a 6 pole-pair coupling is compared with measurements taken on several example assemblies, and the utility of the closed-form expression illustrated with a simple parametric study. The model can be correlated to experimental findings in practice. As to various examples of expressions, methods and systems, U.S. Patent Application having Ser. No. 16/915,043, filed 29 Jun. 2020, entitled "System Hinge Assembly", is incorporated by reference herein.

In the example of FIG. 18, six stable equilibrium positions are shown that correspond to the 6 pole pairs, where the other intermediate positions are unstable. Thus, in such an example, there are stable equilibrium positions at 0, 60, 120, 180, 240, and 300 degrees (e.g., where 0 degrees and 360 degrees are the same point) and there are intermediate unstable positions at 30, 90, 150, 210, 270 and 330 degrees. In various examples, the stable equilibrium positions may be utilized for one or more purposes and they may optionally be adjustable. As an example, stable equilibrium positions may be detent positions, which may optionally be adjustable (e.g., physically, electrically, electromagnetically, etc.).

As an example, a system can include an electromagnetic mover ("EM mover"), which may be, for example, a linear mover and/or a rotary mover. For example, consider a linear mover that can translate a shaft or a rotary mover that can rotate a shaft. As an example, a mover may provide for translation and/or rotation of a shaft (e.g., a shaft that can be moved linearly and that can be rotated).

As an example, a rotary EM mover may include an array of permanent magnets as fixed magnetic poles on a rotor where the poles may be equally spaced around a rotatable shaft of the rotor and include a number of controllable permanent magnets, which may be electropermanent magnets (EP magnets or EPMs) as part of a stator where spacing between the EPMs may be equal but different from rotor spacing. In such an example, number of magnets and spacing of magnets may be selected, together with an ability to switch/reverse magnetic poles of the stator magnets (e.g., via use of EPMs) such that the rotor can be stepped with respect to the stator as the EPMs are switched/cycled in a particular permutation. In such an example, direction of rotation may be reversible, for example, by reversing the particular permutation.

As an example, a system can include one or more of an electric motor that does not include one or more EPMs and an electric motor that includes one or more EPMs. In such an example, one or more electric motors may be included that can perform one or more operations. As to one or more operations, consider, for example, rotating a shaft, translating a shaft, rotating and translating a shaft, rotating a barrel, etc. As an example, a barrel may be a stator of an EM mover and/or may be part of a detent assembly. As an example, a system may include one or more transmissions. As an example, a transmission may include one or more of gears, a cam, a guide, a barrel, etc. As an example, a transmission may provide for transformation of rotary motion to linear motion and/or linear motion to rotary motion. For example, consider a linear EM mover that can translate a shaft (e.g., a rod) that includes a guide that is received in a groove of a barrel such that translation of the shaft causes rotation of the barrel.

As an example, an EM mover can be an EPM stepper motor that can be controlled via supply of current to one or more coils that cause pole switching of one or more EPMs. In such an example, the EPM stepper motor can include a rotor that includes permanent magnets where the rotor can rotate in response to pole switching of one or more EPMs.

As an example, a rotor may be a barrel (e.g., a rotor barrel) where another rotor, an innermost rotor, is disposed at least in part in the barrel. In such an example, the barrel may be part of a detent assembly where magnetic forces between magnets of the barrel and magnets of the innermost rotor provide a detent force, which may be a stabilizing force that acts to stabilize the innermost rotor in an orientation with respect to the barrel. In such an example, the innermost rotor may be coupled to a component such as a housing such that the housing is stabilized at a desired angle (e.g., with respect to a base, another housing, etc.). In such an example, the rotor barrel can be rotatable via a stator that can include EPMs that can cause the rotor barrel to rotate to adjust the orientation of one or more magnetic fields of the rotor barrel. As an example, a rotor barrel may be lockable in a particular orientation such that the rotor barrel does not rotate and, when an adjustment is desired, the rotor barrel can be unlocked such that the EPMs of the stator can cause a change in orientation of one or more magnetic fields of the rotor barrel.

Below, some examples of EM movers are provided, which include examples of EM movers that do not include EPMs and EM movers that include EPMs.

As mentioned, work can be defined as a product of weight (e.g., mg) and distance. For example, if a display housing has a weight of 2 N (e.g., 0.204 kg multiplied by 9.8 m/s$^2$) and a center of mass that is 0.1 m from a rotational axis (e.g., maximum torque of 0.2 N-m or 20.4 kgf-mm), a rotation of the display housing about the rotational axis by an angular increment that increases the vertical height of the center of mass by 0.02 m against gravity would demand work of approximately 0.04 J. However, if the gravity torque is offset by a magnetic torque (e.g., a restoring torque), then the net torque can be zero and the amount of work performed by a user's hand can be approximately zero. As an example, a difference computed between two torque values, which operate in opposing directions, can provide a net torque value. As an example, two torque values can be a maximum gravity torque value and a maximum magnetic torque value where a net torque value can be less than one half of the maximum gravity related torque value, less than one third of the maximum gravity related torque value, less than one quarter of the maximum gravity related torque value, less than one fifth of the maximum gravity related torque value, less than one sixth of the maximum gravity related torque value, or less than one tenth of the maximum gravity related torque value. As an example, consider a maximum gravity related torque of 20.4 kgf-mm and a net torque less than approximately 2 kgf-mm being achieved by a magnetic torque that opposes the gravity related torque.

As an example, consider a maximum net torque of approximately 2 kgf-mm where such a torque can be overcome through use of a user's finger. In such an example, the ergonomic feel of a system can be improved when compared to a system that does not include magnets that provide a restoring torque.

As an example, a system may include an electromagnetic mover (EM mover) such as, for example, an electric motor, a solenoid, etc. In such an example, the EM mover may be utilized for one or more purposes.

As to an electric motor, consider a stepper motor that can provide a torque of approximately 2 kgf-mm, which may be actuated to apply the torque in a clockwise direction and/or a counterclockwise direction. In such an example, the electric motor may be actuated to overcome a net torque value that may be less than or equal to 2 kgf-mm to cause movement of a housing, for example, to cause a first housing to move with respect to a second housing where the first housing and the second housing are operatively coupled via a system hinge assembly.

As an example, where a net torque may be less than 2 kgf-mm, an electric motor may be selected that can provide torque that is equal to or greater than the net torque (e.g., in clockwise and/or counterclockwise directions). As an example, where a net torque is approximately 0 kgf-mm, a relatively small electric motor may be utilized.

As an example, consider a system that can include a microphone operatively coupled to audio circuitry such that the system can receive one or more voice commands. For example, consider a voice command to open a clamshell computer or a voice command to close a clamshell computer. As an example, a system can include a touch sensitive surface that can receive touch input where, in response to touch input (e.g., a touch, a gesture, a passcode, etc.), the system can issue an instruction to actuate an electromagnetic mover to cause movement of a housing. As an example, a system can include a timer that can be utilized to actuate an EM mover to cause movement of a housing. For example, consider a timer that can, after a period of non-use (e.g., idleness), call for an instruction that causes a housing to move such as, for example, to close.

As an example, a system may be instructable to cause movement of a housing (e.g., or a barrel of a detent assembly) by a number of degrees about an axis, to a particular angle with reference to an axis, etc. As an example, a system may include one or more sensors where sensor information from one or more sensors may be utilized to instruct the system to move a housing such as to rotate the housing using a system hinge assembly and/or to move a barrel of a detent assembly, which may be part of a system hinge assembly.

As an example, a system can include one or more EM movers that may perform one or more actions. As mentioned, an action may be to cause rotation of a housing about an axis of a hinge assembly. As another example, an action may be to cause rotation of a barrel that includes one or more magnets such that an orientation of one or more of the one or more magnets (e.g., a magnetic field or magnetic fields) can be altered (e.g., adjusted).

As an example, an EM mover can be an electric motor such as a stepper motor that may be utilized to adjust a shaft, an axle, a barrel, a housing, etc.

As an example, a stepper motor may include one or more permanent magnets that may include one or more electropermanent magnets (EPMs) and/or one or more non-EPMs (e.g., permanent magnets that are not switchable using one or more features of a system). As explained, where desired, one or more approaches may be utilized to reduce one or more torque requirements. For example, the amount of torque to rotate a barrel may be less than 2 kgf-mm and/or the amount of torque to rotate an axle coupled to a housing, etc., may be less than 2 kgf-mm through uses of one or more torque reduction techniques. As to a barrel, consider a barrel supported by one or more bushings where frictional force can be overcome using an electric motor with a torque rating that can be sufficient to overcome the frictional force. As to an axle, consider using permanent magnets that provide a magnetic torque that may be a restoring torque that can counteract, at least in part, a gravity related torque.

As to some examples of stepper motors, consider one or more Faulhaber stepper motors (Dr. Fritz Faulhaber GmbH & Co KG, Schönaich, Germany), one or more NetMotion stepper motors (NetMotion, Livermore, California), etc.

As an example, a 22 mN-m series AM2224 Faulhaber stepper motor (Dr. Fritz Faulhaber GmbH & Co KG, Schönaich, Germany) may be utilized, which is a two phase, 24 steps per revolution stepper motor that has a shaft diameter of 2 mm, NdFeB magnetic material, a diameter of 22 mm, and a length of approximately 27.7 mm. As an example, a stepper motor may be operatively coupled to a gearbox such that a native step angle can be transformed to a desired step angle. As an example, a 0.25 mN-m series DM0620 Faulhaber stepper motor may be utilized, which is a two phase, 20 steps per revolution stepper motor that has a shaft diameter of 1 mm, NdFeB magnetic material, a diameter of 6 mm, and a length of approximately 9.5 mm. Other Faulhaber stepper motors include series AM0820 0.65 mN-m stepper motors (e.g., 8 mm diameter and approximately 13.8 mm length), series AM1020 1.6 mNm stepper motors (e.g., 10 mm diameter and approximately 15.9 mm length), series DM1220 2.4 mN-m stepper motors (e.g., 12 mm diameter and approximately 17.6 mm length), series AM1524 6 mN-m stepper motors (e.g., 15 mm diameter and approximately 16.4 mm length), etc. As mentioned, a torque rating may be selected based on a net torque that accounts for a magnet torque that can be a restoring torque. Suppliers of stepper motors can provide details on torque, which may be specified for various types of operations, states, currents, voltages, etc. As an example, a stepper motor can include an encoder, which may be a magnetic encoder, an optical encoder, etc.

As an example, a stepper motor can be a relatively small stepper motor such as a stepper motor with a diameter less than approximate 25 mm, less than approximately 15 mm, less than approximately 10 mm, etc. As an example, a stepper motor may be operatively coupled to a gearbox (e.g., a transmission, etc.) to provide for a suitable range of adjustments, which may be for a number of step angles. As an example, a gearbox may reduce a step angle, for example, consider reducing a step angle from 18 degrees for 20 steps about 360 degrees to a step angle of 1 degree, a step angle of 2 degrees, etc. As an example, a range may correspond to an expected range of use of a display housing (e.g., a range of angle Φ). For example, where an expected range of adjustment of an optical axis is +/−10 degrees from a normal outward vector of a display, a gearbox may reduce a step angle to 1 degree where 20 steps corresponds to a full rotation of 360 degrees of a motor shaft of a stepper motor (e.g., consider +/−180 degrees). As an example, a gearbox (e.g., a transmission, etc.) may provide a reduction ratio. For example, consider the NetMotion series 08/1 with reduction ratios of 4:1, 16:1, 64:1, 256:1, 1024:1 and 4096:1. Such a gearbox can have a diameter of approximately 25 mm or less, with a body length of approximately 10 mm to 40 mm.

As an example, an electromagnetic mover may be an electric servomotor. For example, consider the linear DC-servomotors marketed by Faulhaber (e.g., consider a LM1247 linear DC-servomotor, etc.). As an example, a linear mover (e.g., a solenoid, linear motor, etc.) can be operatively coupled to a transmission, which may be a ratcheting transmission or another type of linear to rotational transmission. As an example, a transmission may utilize one or more cams.

The aforementioned example linear DC-servomotor LM1247 can apply a continuous force of approximately 3.6 N (e.g., peak force of approximately 10 N) and have a maximum stroke length of approximately 120 mm. As to dimensions, it has a width of approximately 12.5 mm, a height of approximately 19 mm and a length of approximately 50 mm.

Figure 19:
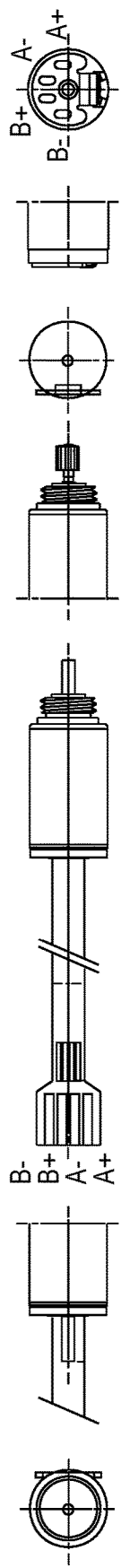
FIG. 19 is a series of diagrams of an example of an adjustment assembly.
Figure 19:
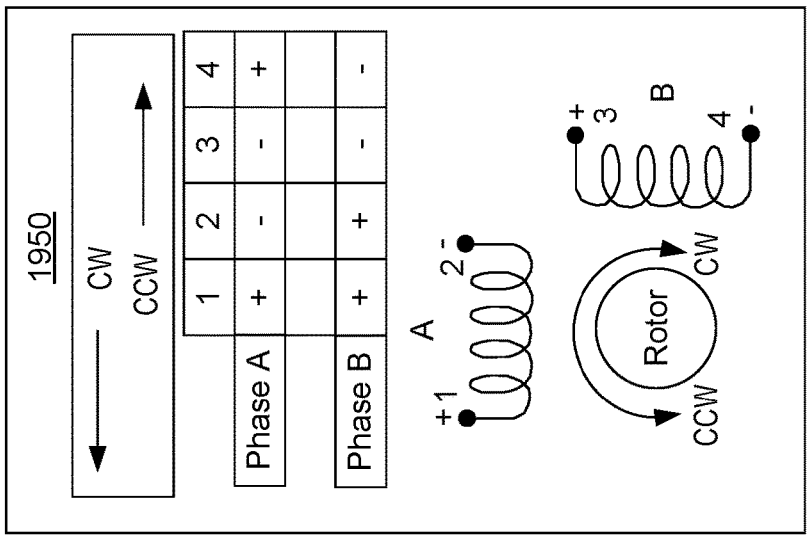
Figure 19:
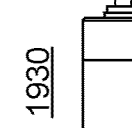
Figure 19:
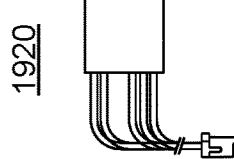
Figure 19:
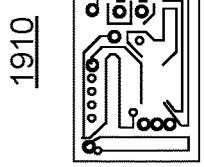

FIG. 19 shows an example of an adjustment assembly 1900 that can include a control board 1910, a connector 1920 and a stepper motor 1930, optionally operatively coupled to a gearbox. FIG. 19 also shows a table 1950 with indications as to directions and phases. For example, consider phases A and B where a combination of plus and minus of each phase provides for four states (e.g., ++, −+, −−, +−). As an example, a linear EM mover may include one or more of the features of the adjustment assembly 1900 (e.g., a control board, a connector, optionally a transmission, etc.).

As mentioned, a stepper motor may utilize one or more EPMs to rotate a rotor, which may be a rotor with a shaft or may be a rotor barrel. As an example, a linear motor may utilize one or more EPMs.

An electropermanent magnet (EP magnet or EPM) is a type of permanent magnet in which the external magnetic field can be switched on or off, for example, using a current pulse. An EPM can include a "hard" magnetic material (e.g. a relatively high coercivity, e.g., NdFeB or NIB) and a "soft" magnetic material (e.g., a relatively low coercivity, e.g., AlNiCo such as Alnico5), which can be capped at ends with a magnetically soft material (e.g., iron, Fe) and wrapped in a coil. When magnetically soft and hard materials of an EPM have the same magnetization, the EPM produces an external magnetic field that corresponds to an on-state, and when directions of magnetizations are reversed, the EPM produces no net external field across its poles, which corresponds to an off-state. As an example, an EPM can have a magnetic field with no electrical power being supplied to maintain the magnetic field where, if switching is desired, electrical power can be supplied to effectuate switching. As an example, an EPM can be switchable according to a schedule, a signal, etc., where power consumption may be relatively small while in an on-state the EPM provides sufficient magnetic field strength (e.g., for attraction and/or repulsion).

NdFeB (NIB) tends to have a relatively large coercivity (1000 kA/m), while Alnico5 tends to have a relatively small coercivity (48 kA/m); noting both have approximately the same residual induction: 1.28 T and 1.26 T, respectively. When a pulse current (e.g., a current pulse) passes through a coil (e.g., a copper coil, etc.), the polarity of an Alnico5 magnet can change while polarity of a NIB magnet remains the same. In such an example, magnetic field changes according to the polarity of the Alnico5 magnet.

Figure 20:
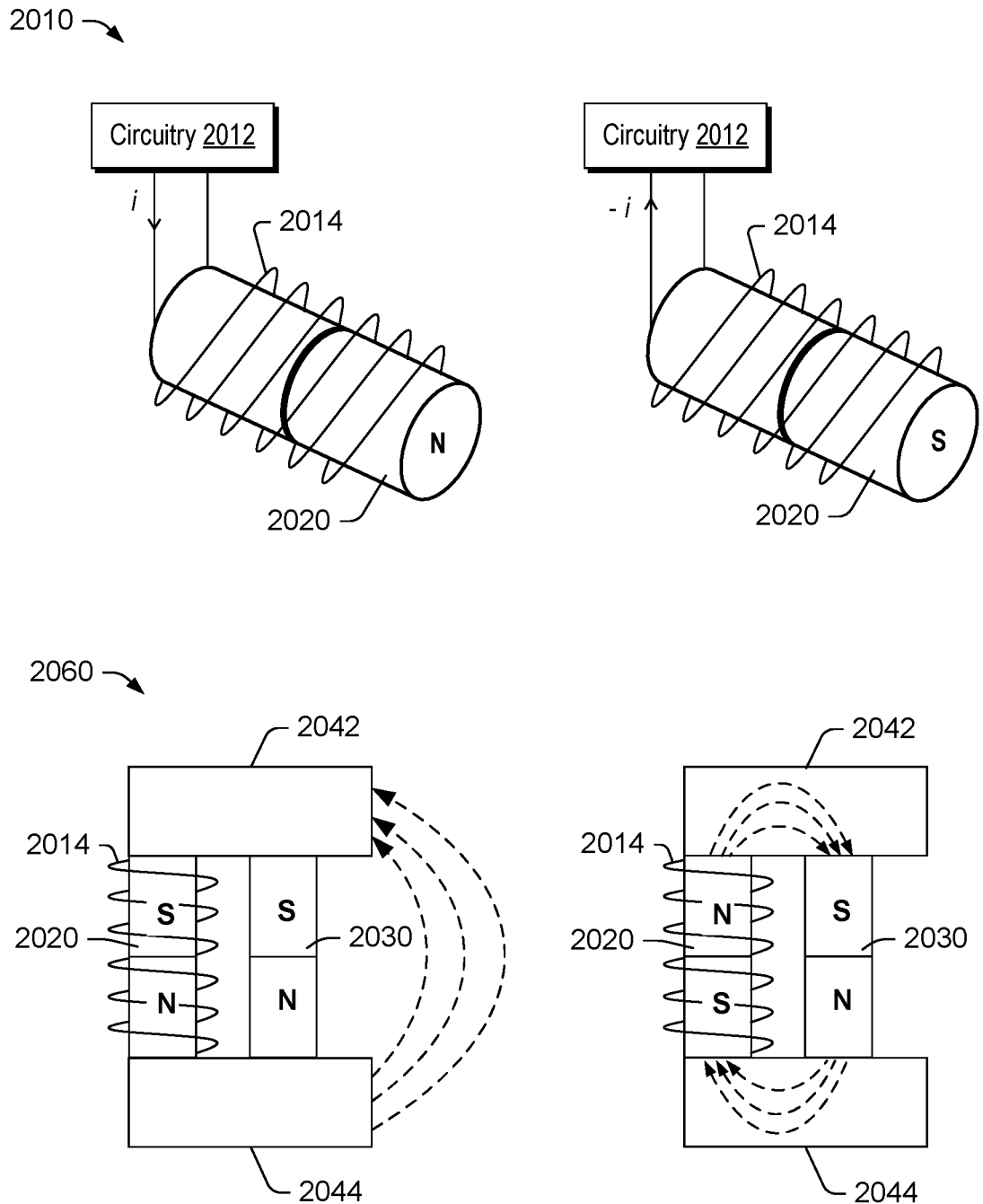
FIG. 20 is a series of diagrams of examples of electropermanent magnets.

FIG. 20 shows an example of a sub-assembly 2010 that includes circuitry 2012 that can control current through a coil 2014 where a magnet 2020 of relatively low coercivity material is disposed at least in part within a bore or core of the coil 2014. As shown, depending on current supplied by the circuitry 2012, the direction of the north-south poles can be switched such that the north pole is fore and the south pole is aft or the south pole is fore and the north pole is aft.

FIG. 20 also shows an EPM 2060 that includes the coil 2014, the magnet 2020, a magnet 2030 of relatively high coercivity, and end caps 2042 and 2044. As shown, the EPM 2060 can be in an on-state (left) or an off-state (right) that depends on the current supplied (e.g., by the circuitry 2012). In the on-state, magnetic fields of the magnets 2020 and 2030 are aligned in a common direction (e.g., parallel); whereas, in the off-state, the magnetic fields of the magnets 2020 and 2030 are not aligned (e.g., anti-aligned or anti-parallel).

In the example of FIG. 20, the EPM 2060 may utilize a relatively smaller coil in that the coil 2014 does not cover the magnet 2030. In other words, the magnet 2020 can be disposed at least in part within the bore of the coil 2014 while the magnet 2030 is not disposed within the bore of the coil 2014. As an example, an EPM may include a coil with a bore where magnets are disposed at least in part in the bore where one magnet is of a relatively low coercivity (e.g., switchable pole magnet) and another magnet is of a relatively high coercivity.

As an example, an EPM can include a material such as Alnico5 wrapped in a copper coil where polarity can be switched via a pulse current. As mentioned, a smaller sized coil may reduce overall size and may reduce overall mass compared to a coil that is sized to surround two magnets (e.g., an Alnico5 magnet and a NIB magnet).

As an example, an EPM can be made of various components where one or more components can be movable with respect to one or more other components. For example, consider a sub-assembly that includes a coil with a first magnet disposed at least in part in therein as being in one position while a second magnet can be in a position that is controllable via control of current in the coil. For example, the second magnet may be positionable depending on whether its magnetic field is attracted or repelled by the magnetic field of the first magnet. In such an example, an EPM may be a disparate component EPM where one or more components may be movable while one or more other components are stationary where movement occurs responsive to control of current supplied to one or more coils where low coercivity material is disposed within each of the one or more coils.

As explained, a system may include one or more EPMs. Electromagnetic force can demand specialized materials and high-density coiled geometries while delivering relatively low ratios of force to static power consumption due to the unfavorable scaling of coil resistance in relatively small devices. As an example, a relatively small device may include components with dimensions of the order of millimeters (e.g., less than approximately 15 mm). For example, consider a hinge assembly that includes components to provide one or more pole pairs where such components may be of the scale of a hinge component (e.g., a barrel or an axle) or less.

As explained, a system can include one or more electronically-controlled EPMs, which may provide for torque (e.g., restoring torque, rotational torque to move a component, etc.), holding between surfaces (e.g., clamping a barrel, etc.), etc.

An EPM may be suitable for relatively small-scale systems where time between switching events is not too short. Energy to switch an EPM can be proportional to its volume, while it can exert force proportional to its area. In various examples, EPMs do not require coils with as high a density as electromagnets, as long as average time between switching events is sufficiently long.

Figure 21:
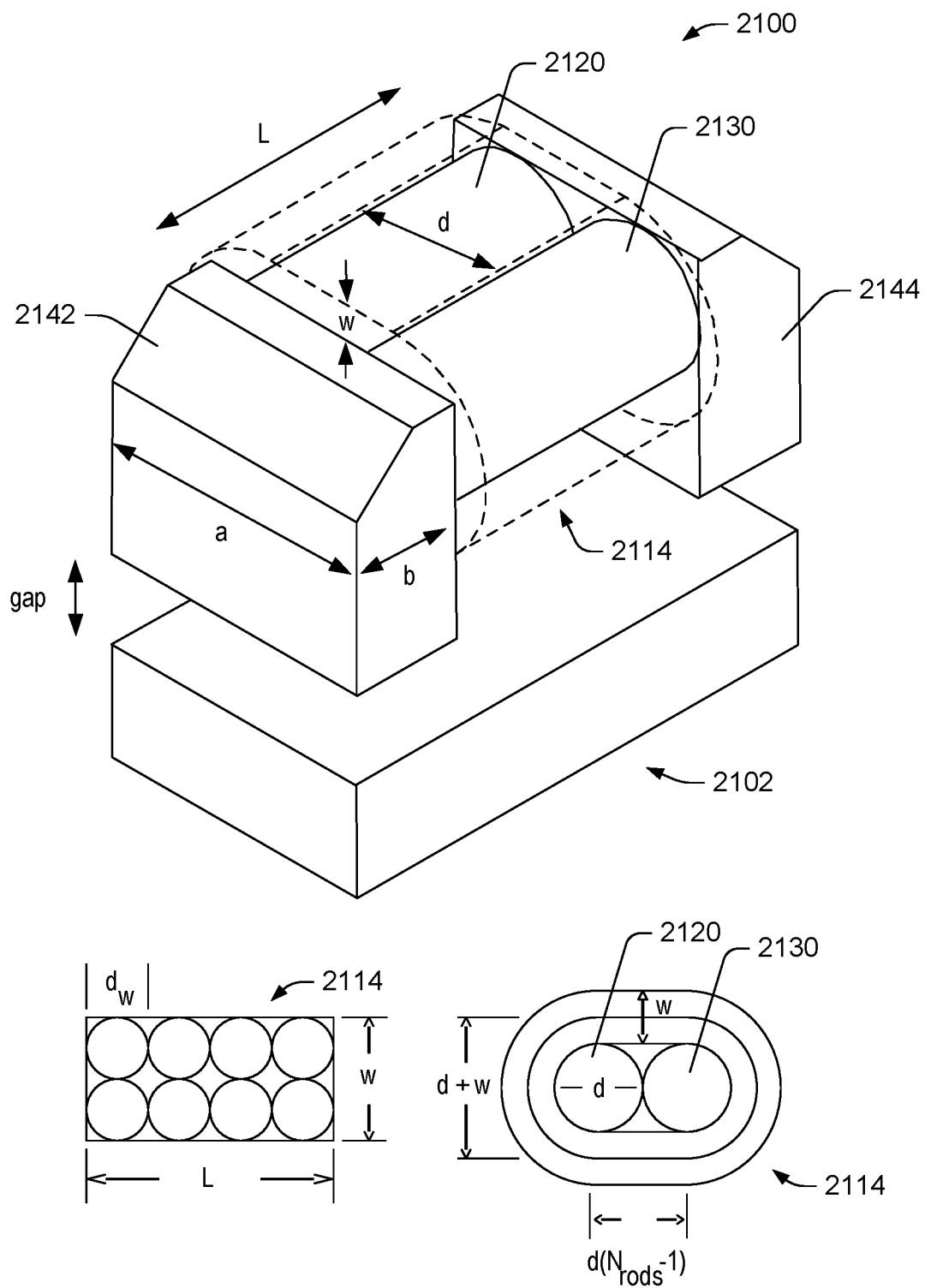
FIG. 21 is a series of diagrams of an example of an electropermanent magnet.

FIG. 21 shows a schematic view of another example of an EPM 2100 with a keeper bar 2102. The EPM 2100 can include a coil 2114 disposed about materials 2120 and 2130 such as, for example, consider a parallel combination of NIB (NdFeB), which has a relatively high coercivity, and Alnico (AlNiCo), which has a relatively lower coercivity (e.g., consider Alnico5). As a NIB magnet has a quite high coercivity, flux through it can be maintained along a common direction. As an example, when the EPM 2100 is in its off-state, the NIB and Alnico magnets (see materials 2120 and 2130) can be oppositely magnetized, such that flux circulates internally and does not cross air gaps to the keeper bar 2102. When the EPM 2100 is in its on-state, the NIB and Alnico magnets (see materials 2120 and 2130) can be magnetized in the same direction, such that the flux from both crosses through to the keeper bar 2102, and force is required to pull the portions apart.

The EPM 2100 of FIG. 21 may be compared to the EPM 2060 of FIG. 20 to see that the EPM 2100 includes the coil 2114 that encompasses both the NIB magnetic material 2130 and the Alnico magnetic material 2120; whereas, the coil 2014 of the EPM 2060 encompasses the Alnico magnetic material 2020 and not the NIB magnetic material 2030.

FIG. 21 also shows various dimensions, including a coil thickness w, a coil length L, an NIB diameter and an Alnico diameter d, a gap with respect to a target surface (e.g., of the keeper bar 2102), and end component dimensions a and b of the end components 2142 and 2144.

As to various parameters, consider, for example, square wire packing where the sum of the area of bounding boxes around each wire equals the total cross-sectional area of the coil. In such an example, consider $Nd^2_w=Lw$. As shown, a middle turn of the coil 2114 can have a distance w/2 from the core, where the turn is an average-length turn. In such an example, the total length of the wire can be N times the length of such a turn. By adding the lengths of the straight segments and circular caps, the length of the wire can be defined: $I=N(2d(N_{rods}-1)+\pi(d+w))$.

As to magnetizing voltage and switching energy, consider the DC series resistance of a coil being that of the resistance of the unrolled wire, where the length of the unrolled wire is N times the length of an average-length turn. As the parameter, or dimension, w, approaches zero, the resistance approaches infinity; however, resistance, R, cannot be made arbitrarily small as w approaches infinity such that there are diminishing returns when increasing the coil thickness w much above d in an attempt to reduce R. The voltage drop across the coil is the sum of the induced voltage, from Faraday's law, and the voltage across the series resistance, from Ohm's law. In general, higher voltage can result in faster switching; noting that there is a minimum voltage below which an EPM does not reach the switching field $H_{mag}$ after any amount of time: $V_{min}=I_{max} R$. The minimum voltage is independent of length scale and proportional to the number of turns N. As an example, an EPM may be considered as a series LR circuit where application of a voltage pulse results in a first-order rise in current. Energy for switching can be determined by integrating power over a pulse, where energy can be expressed in terms of inductance, resistance and minimum voltage; noting that the energy can be proportional to the cube of the length scale.

EPMs can demand a uniform energy per volume to magnetize. As to some examples of energy sources, consider one or more types of batteries.

Figure 22:
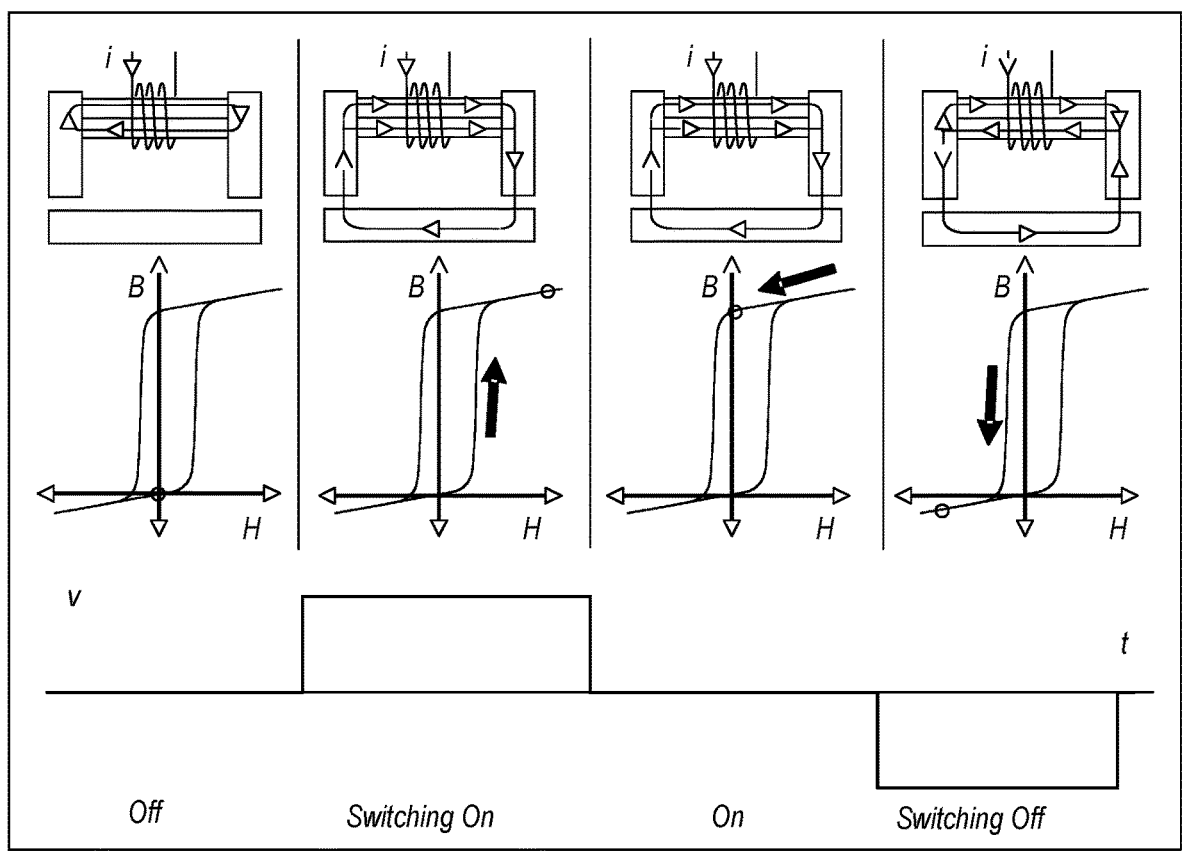
FIG. 22 is a series of example plots for operation of an electropermanent magnet.

FIG. 22 shows various plots 2200 of operation of an EPM such as the EPM 2100 of FIG. 21; noting that such operation or operations may be applied to an EPM such as the EPM 2060 of FIG. 20, where the coil 2014 encompasses the magnetic material 2020.

As shown in FIG. 22, an EPM can be switchable between an on-state and an off-state and vice versa. In the off-state, the two magnetic materials are oppositely polarized, so magnetic flux circulates inside the device, and there is no force on the target. In the on-state, the two magnetic materials are polarized in the same direction, so magnetic flux travels externally and through to a target, attracting the target to the EPM (or the EPM to the target).

As an example, a current pulse in a coil of proper magnitude and sufficient duration can provide for switching an EPM between the on-state and the off-state, for example, by switching the magnetization of the Alnico magnet alone, which has a lower coercivity than the NIB magnet.

The plots 2200 of FIG. 22 show operation of an EPM through a full cycle. As shown, a positive current pulse through the coil results in a clockwise flux through the EPM and the keeper, magnetizing the Alnico magnet rightward, turning the EPM on; while a negative current pulse imposes a counterclockwise flux through the EPM and keeper, magnetizing the Alnico magnet leftward, turning the EPM off.

As to the bistability of an EPM device, NIB and Alnico magnets can be in parallel and of a common length such that they see a common magnetic field H, and their magnetic flux adds. On the scale of the Alnico B/H curve, the NIB B/H curve appears as a horizontal line, because of its higher coercivity. For example, grade N40 NIB can have a coercivity of approximately 1000 kA/m (e.g., with residual induction of approximately 1.28 T) while a sintered Alnico5 can have a coercivity of approximately 48 kA/m (e.g., with residual induction of approximately 1.26 T).

A polarized NIB magnet can bias up a symmetrical B/H curve of the Alnico magnet, such that the two taken together can have a residual induction near zero on the lower part of the hysteresis loop, but a positive residual induction on the upper part of the hysteresis loop. A current pulse through a coil can impose a magnetic field H across the EPM, cycling it around the biased-up hysteresis loop shown in the plots 2200.

Figure 23:
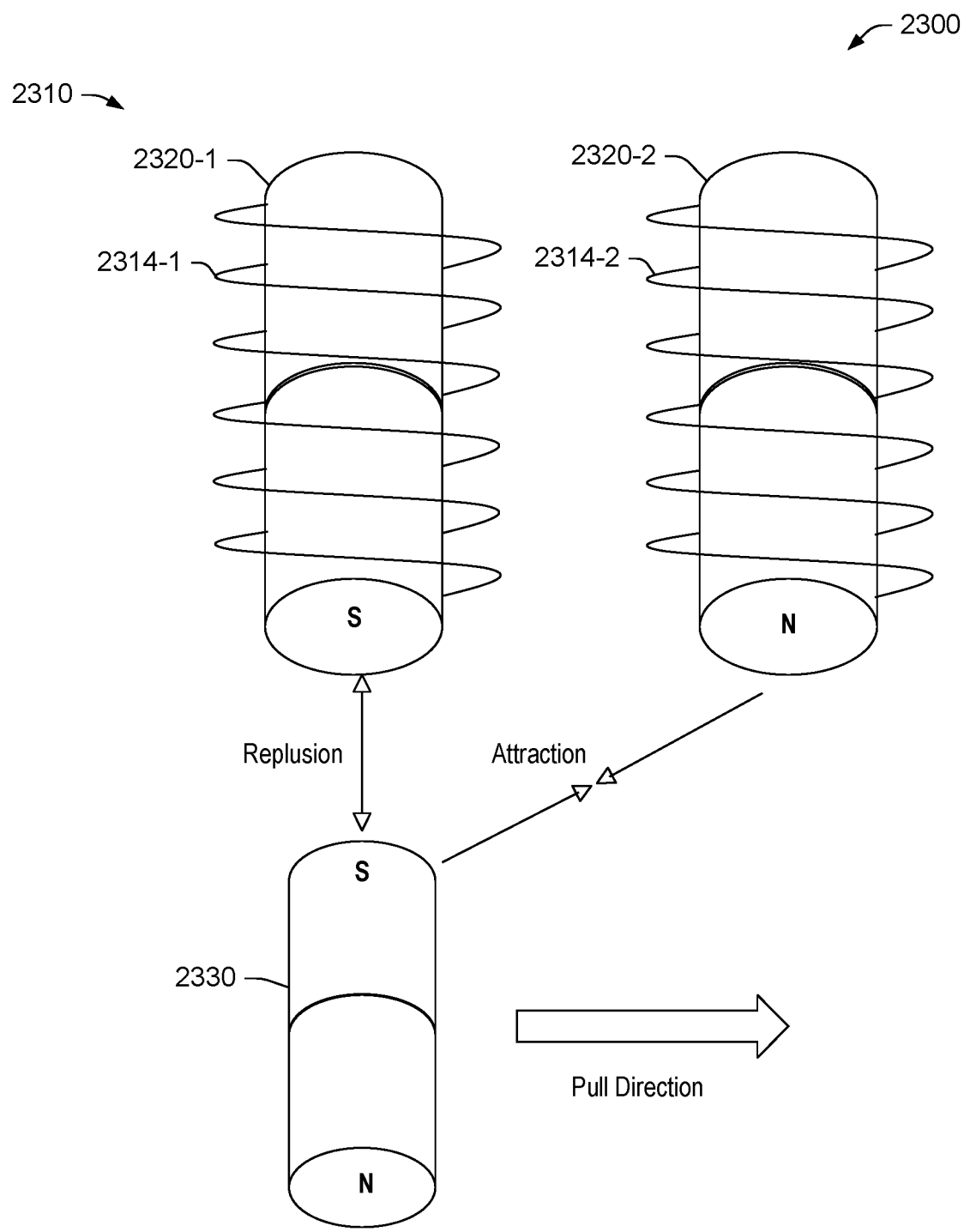
FIG. 23 is a diagram of an example of operation of an electromagnetic mover assembly.

FIG. 23 shows an example of a controllable magnetic assembly 2300 that includes a plurality of low coercivity magnets (e.g., Alnico5) 2320-1 and 2320-2 and coils 2314-1 and 2314-2 that can be used in combination with one or more stronger magnets with higher coercivity (e.g., NIB) 2330. As shown in FIG. 23, the poles of the magnets 2320-1 and 2320-2 differ in that they are anti-parallel such that, with respect to the poles of the magnet 2330, the magnet 2320-1 provides a repulsion force while the magnet 2320-2 provides an attraction force. In such an example, a magnetic force is experienced by the magnet 2330 that pulls it in the direction of the magnet 2330-2. In a linear motor, one component or sub-assembly may be fixed while another component or sub-assembly can move. For example, consider the magnet 2330 as being part of a sub-assembly that can move while the magnets 2320-1 and 2320-2 and their coils 2314-1 and 2314-2 remain stationary (e.g., relatively).

Figure 24:
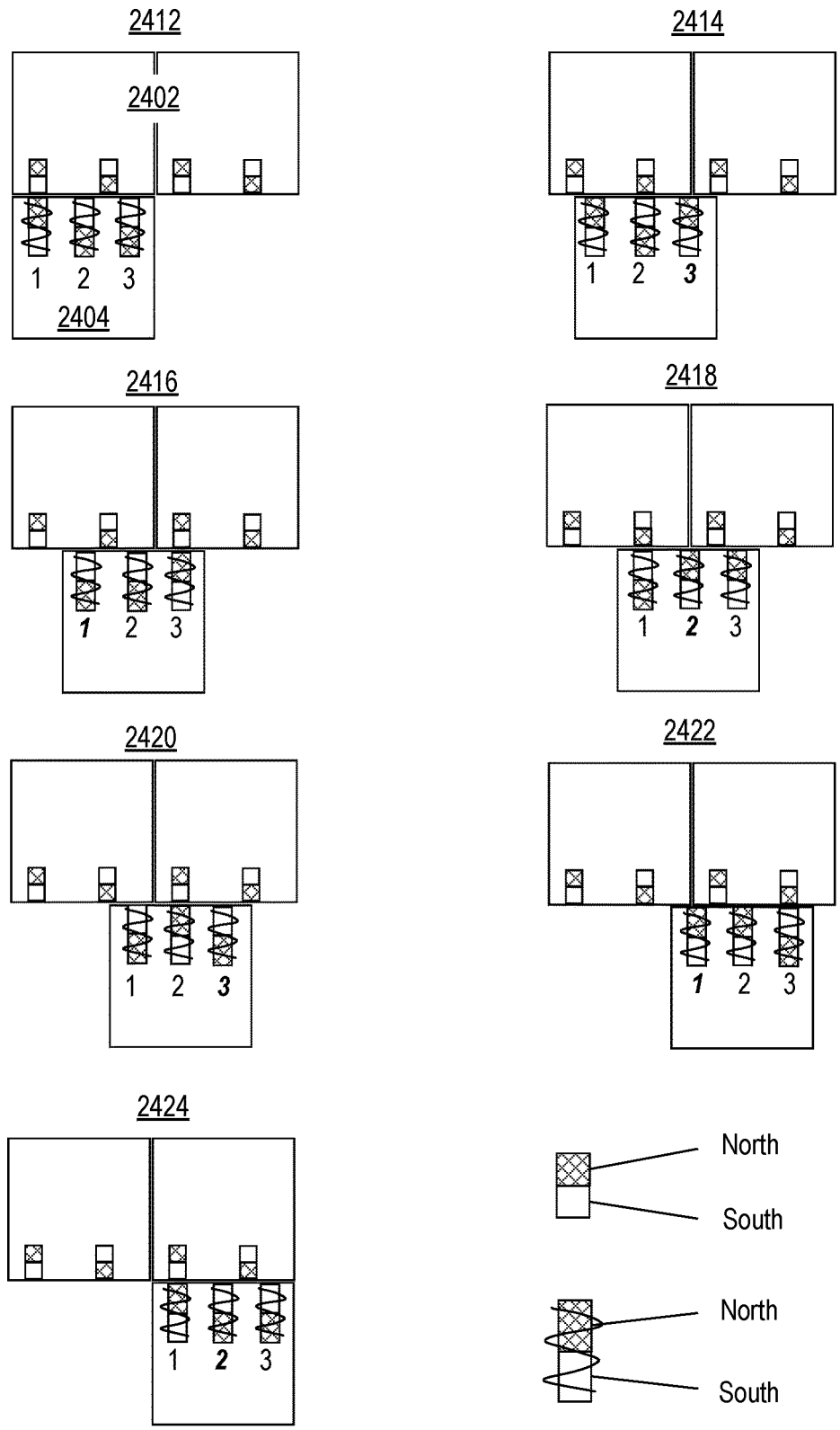
FIG. 24 is a diagram of an example of a method utilizing an electromagnetic mover.

FIG. 24 shows an example of two sub-assemblies 2402 and 2404 where the sub-assembly 2404 can be moved in a linear direction with respect to the sub-assembly 2402. As shown, the sub-assembly 2402 includes four magnets, which may be NIB magnets, and the sub-assembly 2404 includes three magnets, which may be Alnico5 magnets, each having a corresponding coil through which the polarity of each of the three magnets may be individually controlled.

In the example of FIG. 24, the sub-assemblies 2402 and 2404 can be in physical contact such that a surface of the sub-assembly 2402 slides along a surface of the sub-assembly 2404. In such an example, the physical contact can be via magnetic attraction and the sliding may be incremental such as slide-stop-slide-stop, etc. Such increments may be referred to as linear steps that are guided by a surface of the sub-assembly 2402 being in contact with a surface of the sub-assembly 2404. The motion of the sub-assembly 2404 can be a rectilinear motion. As an example, consider a switching between permutations of the controllable magnets to achieve an average linear speed of approximately 20 mm per second for the sub-assembly 2404 with respect to the sub-assembly 2402 (see, e.g., an article by Zhu et al., A programmable actuator for combine motion and connection and its application to modular robot, Mechatronics, Elsevier, 2019, 58, pp. 9-19 (arXiv:1904.09889v1 [cs.RO]), which is incorporated by reference herein).

In FIG. 24, an Alnico5 magnetic material can be approximately 8 mm in length with a 2.5 mm diameter wrapped with 250 turns of a 0.15 mm enameled copper wire and the NIB magnetic material can be approximately 1.5 mm in length with a 2 mm diameter. In FIG. 24, each box can represent a cube that has a side length of 1.5 cm. The mass of the sub-assembly 2404 can be approximately 12 grams.

As shown in the various state diagrams 2412, 2414, 2416, 2418, 2420, 2422, and 2424, which correspond to a complete cycle of the three magnets of the sub-assembly 2404, the polarity of those three magnets changes incrementally to control motion of the sub-assembly 2404 (e.g., the sub-assembly 2404 walks from left to right). For example, as explained with respect to FIG. 23, a repulsive force between a first magnet "1" and a NIB magnet and an attractive force between a second magnet "2" and the NIB magnet can make the NIB magnet move (e.g., from left to right). In such an example, when the motion is complete, the NIB magnet can be connected with the second magnet where no additional power supply is needed to maintain the connection. If it is desirable to move the NIB magnet in the reverse direction, the polarities of the first magnet and the second magnet may be changed via use of the coils 2314-1 and 2314-2.

As an example, a low coercivity magnetic material and coil sub-assembly can be controllably supplied with current via the coil. As an example, controllability may be for pole switching and/or magnetic field strength. For example, an enhanced magnetic field may be achieved as desired using a continuous electric current in the coil, which can contribute to increase the magnetic flux density. In such an example, the enhanced magnetic field may be useful in some scenarios, for example, to strengthen a connection with a magnet (see, e.g., the magnet 2330 of FIG. 23). However, as such a function consumes power and generates heat, it may be suitable where a greater connection force, quick movement or complex motion may be desired.

Figure 25:
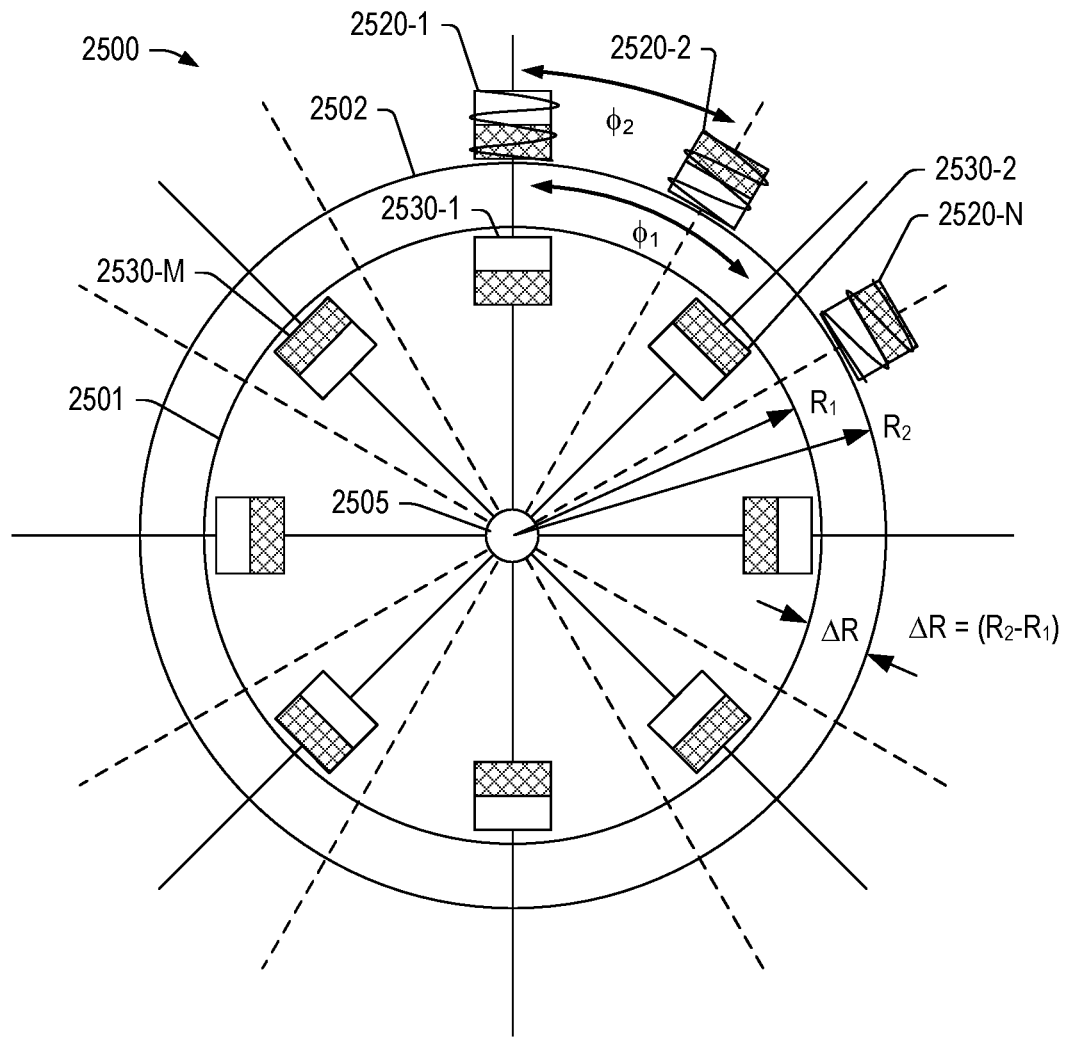
FIG. 25 is a diagram of an example of a stepper motor that includes electropermanent magnets.

FIG. 25 shows an example of a stepper motor 2500 that includes EPMs 2520-1, 2520-2, and 2520-N of a stator 2502 (e.g., collectively EPMs 2520) along with magnets 2530-1 to 2530-M of a rotor 2501 (e.g., collectively magnets 2530) that is positioned with respect to the stator EPMs 2520.

As shown, the magnets 2530 are spaced by an angle $\phi_1$ and the EPMs 2520 are spaced by an angle $\phi_2$ where $\phi_1$ is not equal to $\phi_2$. The magnets 2530 can be set at a radius $R_1$ and the EPMs 2520 set at a radius $R_2$, where $R_2$ is greater than $R_1$ such that a gap $\Delta R$ can exist between the rotor 2501 and the stator 2502.

In the example of FIG. 25, the rotor 2501 can include a rotatable shaft 2505, which may be an axle. The rotatable shaft 2505 may be supported by one or more bushings, one or more bearings, etc. In the example of FIG. 25, switching of the EPMs 2520 of the stator 2502 can cause the rotor 2501 to rotate as rotatably supported.

As to dimensions, the stepper motor 2500 may be sized as desired using appropriate magnetic materials. As explained with respect to the example of FIG. 24, coiled Alnico5 components can each be approximately 8 mm in length with a 2.5 mm diameter wrapped with 250 turns of a 0.15 mm enameled copper wire and NIB components can each be approximately 1.5 mm in length with a 2 mm diameter. Given the example angles in FIG. 25, $R_2$ may be approximately 4.8 mm and $R_1$ may be approximately 2.5 mm. Thus, the diameter of the stator 2502 of the stepper motor 2500 may be approximately 10 mm where a portion may be extended radially outwardly to accommodate the EPMs 2520 while the diameter of the rotor 2501 may be appropriately sized to be less than approximately 10 mm. Thus, the stepper motor 2500 of FIG. 25 may be sized to be relatively small with a relatively small mass (e.g., optionally less than approximately 50 grams).

As an example, an EPM stepper motor can include more than three EPMs. For example, consider a stepper motor such as the stepper motor 2500 as including another set of three EPMs that may be provided to increase torque. As an example, an EPM stepper motor may include a number of EPMs, which can be greater than or equal to three, where the number is selected to provide a maximum torque. As an example, where two pairs of EPMs are provided, they may be provided for torque, speed of rotation, holding or connection force, redundancy, etc. As mentioned, current provided to one or more coils may be terminated after a motion has been completed or may be maintained, optionally at a controlled level, which may, for example, provide for enhanced connection force (e.g., stability at a position, etc.).

As to a sequence or permutation, referring again to the example of FIG. 24, motion can be achieved using a number of steps where, at each step, only one EPM magnet changes its status such that there is a need for energy being directed to only one EPM at that time. In the example of FIG. 24, the order of the magnets which change the status can be 3-1-2-3-1-2. When the motion ends, magnets do not need the energy for connection due to the permanent magnetic field generated by Alnico5 and NIB magnets.

Figure 26:
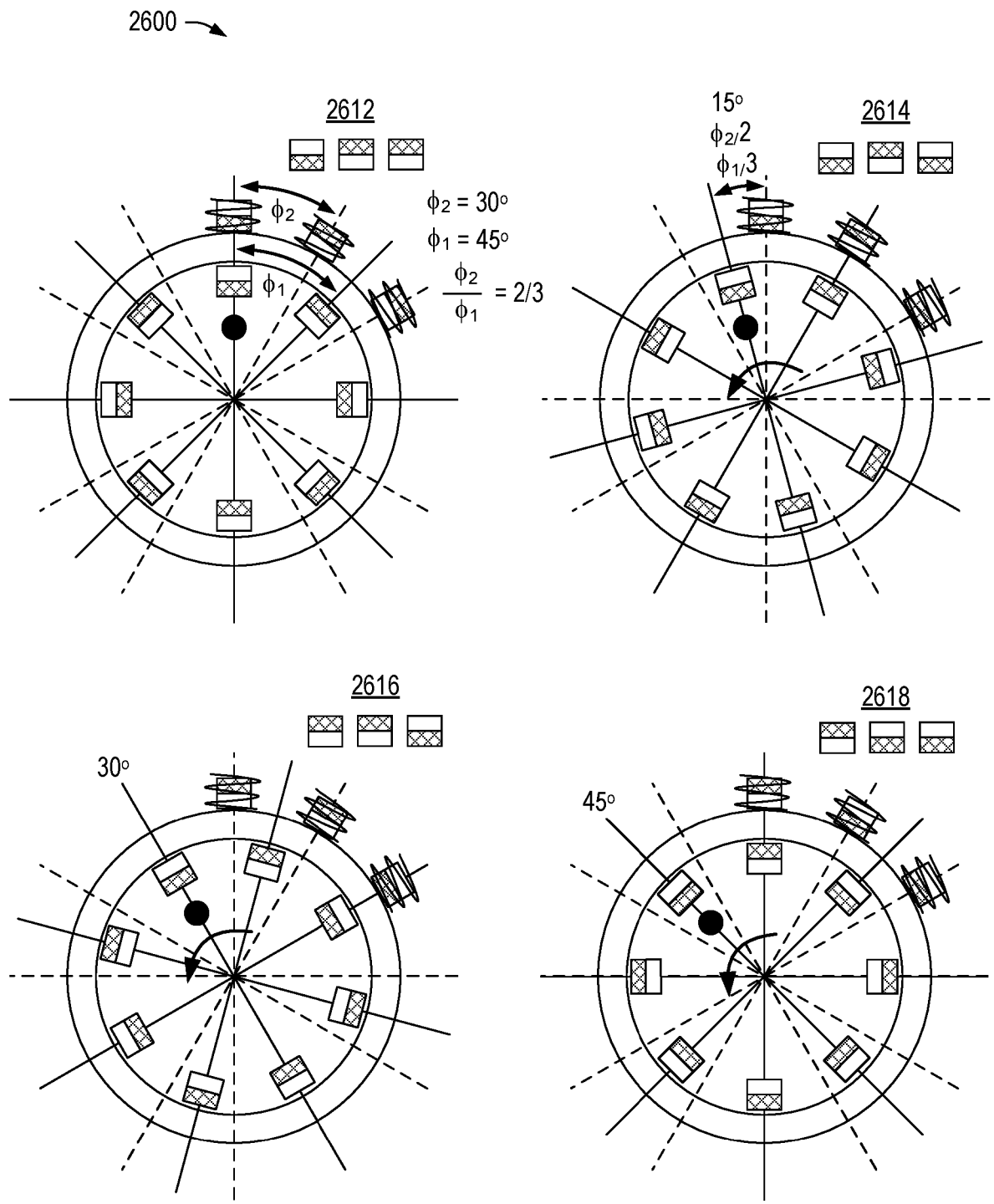
FIG. 26 is a diagram of a method of operating the stepper motor of FIG. 25.

FIG. 26 shows an example of a method 2600 for operating an EPM stepper motor using permutations for three EPMs. As shown, an initial state 2612 can have a particular permutation of the three EPMs and changing polarity of one of the EPMs can transition the EPM stepper motor to a subsequent state 2614 where the rotor is rotated by 15 degrees. In another subsequent state 2616, the rotor is rotated by another 15 degrees for a total of 30 degrees and, in yet another subsequent state 2618, the rotor is rotated by another 15 degrees for a total of 45 degrees. In the example of FIG. 26, the angle $\phi_1$ is 45 degrees and the angle $\phi_2$ is 30 degrees (e.g., less than $\phi_1$). As an example, such angles may be selected in a manner that depends on desired step angle. Additionally, while the rotor is shown as including magnets about 360 degrees, where stepping is limited to less than 360 degrees, fewer magnets may be utilized. For example, in the method 2600, three or four rotor magnets may suffice for the 45 degrees of rotation.

As an example, an EPM stepper motor can be a 360 degree rotation EPM stepper motor or a less than 360 degree rotation EPM stepper motor. As explained, in some instances a system hinge assembly may provide for rotation of a housing in a range of angles that is approximately 180 degrees or less. In such an example, an EPM stepper motor can include a rotor with magnets that span an arc about an axis (e.g., a shaft or an axle axis) that is less than 360 degrees. As explained, where a detent assembly is utilized to stabilize a component such as a housing about a system hinge assembly axis, the desired range of angles to be stabilized may be less than approximately 180 degrees. In such an example, an EPM stepper motor can include a rotor, which may be a rotor barrel, with magnets that span an arc about an axis (e.g., a shaft or an axle axis) that is less than 360 degrees.

Figure 27:
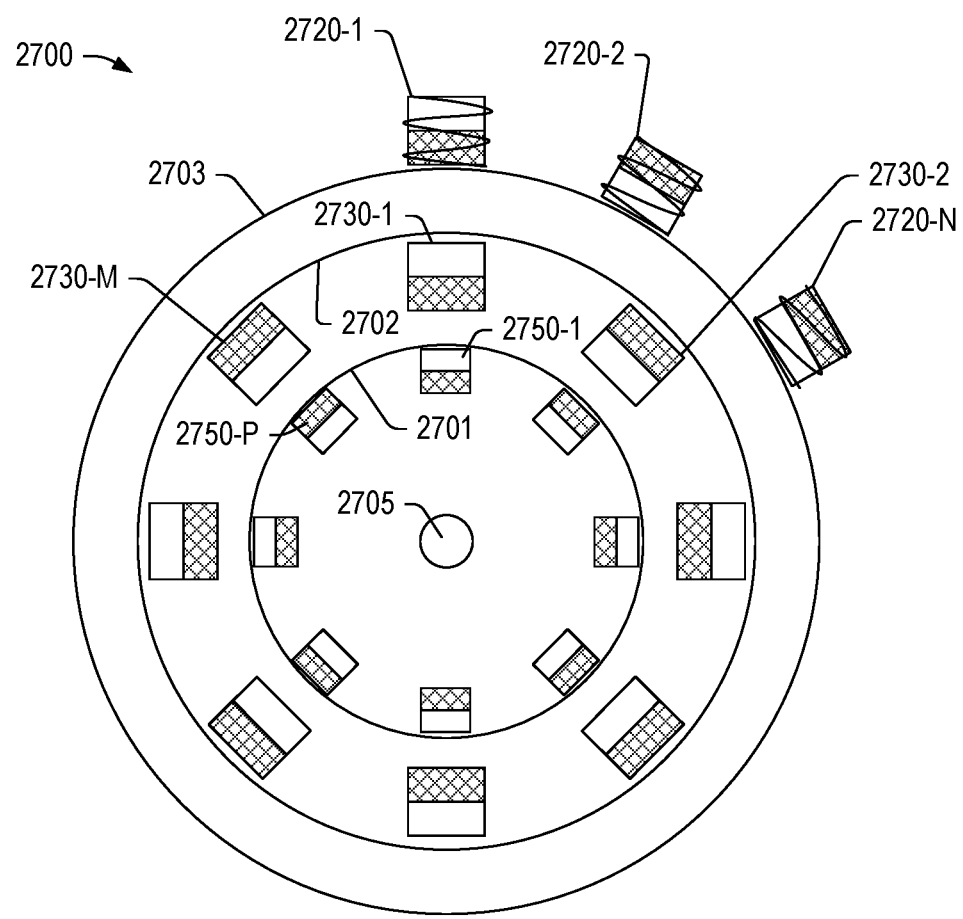
FIG. 27 is a diagram of an example of an electromagnetic mover.

FIG. 27 shows an example of an EPM stepper motor 2700 with an innermost rotor 2701, a rotor barrel 2702 and a stator 2703 that includes controllable EPMs 2720-1, 2720-2 and 2720-N. As shown, the rotor barrel 2702 includes magnets 2730-1 to 2730-M and the innermost rotor 2701 includes magnets 2750-1 to 2750-P. As shown, M may be equal to P where N is less than M and P.

The EPM stepper motor 2700 may be part of a detent assembly that can provide for adjustment of a detent angle through controlling current to one or more of the EPMs 2720. In such an example, as explained with respect to the example of FIG. 26, rotational increments can be less than an angle between the EPMs 2720 and can be less than an angle between the magnets 2730. For example, in FIG. 26, the increment or step angle is shown to be one half of the angle $\phi_2$. Thus, in FIG. 27, the detent assembly with a limited number of magnets can provide for an increased number of detent angles through EPM-based switching to adjust the orientation of the rotor barrel 2702.

In the examples of FIG. 25, FIG. 26 and FIG. 27, the EPMs are shown as being separated in that certain magnets are movable with respect to other magnets. As an example, one or more EPMs may be utilized where magnets are not movable with respect to each other. For example, consider the EPM 2100 of FIG. 21. As an example, a stator may include a number of EPMs such as the EPM 2100 of FIG. 21 and a rotor can include a number of permanent magnets, which may be, for example, NIB material permanent magnets. In such an example, the EPMs may be controlled via supply of current to turn one or more of the EPMs on or off such that the rotor rotates in a desired direction with respect to the stator.

As an example, a system can include an enhanced magnetic coupling/hinge with an adjustable reference position. As an example, an N pole-pair (multi-pole) magnetic coupling/hinge can include N-equilibrium positions. For example, consider the arrangement of FIG. 16 where the number of pole pairs is 6 and where each of the pole pairs corresponds to a particular detent position (e.g., N equilibrium positions may be utilized as magnetic field detent positions). Such N positions can be defined relative to a reference position, for example, consider a reference position of a shaft and a coupling housing (e.g., at a time of installation, assembly, etc.). If such a reference can be moved or shifted by a desired angle, then the "fixed" N-detent positions may be moved to different N' desirable positions (e.g., providing for an increased number of detent positions, etc.). For example, a 12 pole-pair magnetic coupling can be installed and have 12 equilibrium angles, with 30 degrees of separation between detent positions. For example, given a clamshell computing system, consider one of the detent positions corresponds to a 130 degree opening angle. In such an example, consider a user that would like a different, more desirable opening angle for reading at 120 degrees. In such an example, this may be achieved, for example, by rotating a barrel or an axle of a magnetic torque assembly by 10 degrees relative to an original installed configuration. In various examples, a barrel can be rotated while an axle remains fixed where the axle is received at least in part by a bore of the barrel.

As an example, a system can include one or more mechanisms that provide for adjustment to magnetic force(s) of a hinge assembly or hinge assemblies. For example, consider a clamping mechanism that can be released for physical rotation of a barrel and then clamped to fix the barrel in a rotated position. In such an example, the clamping mechanism may be mechanical, electrical and/or magnetic. For example, consider a bicycle seat type of clamp such as a quick-release skewer that can include a rod threaded on one end and with a lever operated cam assembly on the other. The rod may be inserted into a hollow axle where a nut is threaded on, and the lever is closed to tighten the cam. Such an assembly may allow for locking in a hinge assembly in a desired position. In such an example, a barrel may be a type of post that can be supported by a bushing that allows for rotation and support and where another bushing is unclampable and clampable (e.g., unlockable and lockable) to maintain a desired rotational position. As to an EPM approach, consider switching electronically that can effectively rotate an orientation of one or more poles. As an example, an EPM approach can include turning one or more magnetic fields on and/or turning one or more magnetic fields off. In such an example, components may be physically fixed or may be physically positionable.

As an example, an EPM approach can utilize electrical power only for switching. For example, consider switching off to release a clamp for physical rotation of a barrel and then turning on to tighten the clamp to fix the rotated position of the barrel. As explained, a system can include multiple EPMs, optionally in combination with one or more permanent magnets that are not EPMs (non-EPM). In such an example, electronic switching may be utilized to adjust one or more magnet field orientations.

As an example, an EPM approach and/or one or more other approaches can be triggered using one or more signals from one or more sensors. For example, consider a sensor-based approach to determining an opening angle of a display housing of a clamshell computing system. In such an example, an automatic adjustment mechanism may physically rotate a barrel, which may be a rotor barrel, electronically alter one or more magnetic field orientations via using one or more EPMs, etc. Where a barrel is to be rotated, a clamp or clamps may be electronically actuated for release of the barrel and then deactuated for retention of the barrel in a rotated position.

As to a motorized adjustment, consider a barrel as a cylindrical housing for magnets where a gear coupled to the barrel is driven by a pinion gear of a stepper motor where there can be a lock that can lock and unlock the barrel. As mentioned, a lock can be physically and/or electrically operable (e.g., an EPM lock, a solenoid clamp that can release through solenoid activation, etc.).

If an orientation has a north pole direction to be rotated to another north pole direction, consider an example method that includes using EPMs to switch off a magnetic field, commanding a solenoid to unclamp a coupling body so it can rotate, commanding a stepper motor to rotate to desired angle, commanding the solenoid to clamp the coupling in the new position, and switching on the EPMs to reactivate the magnetic field. Such an example, a method can achieve rotation of N detent positions to desired positions. As mentioned, as an example, one or more EPMs may be switched without physical rotation and/or one or more permanent magnets may be physically rotated.

Figure 28:
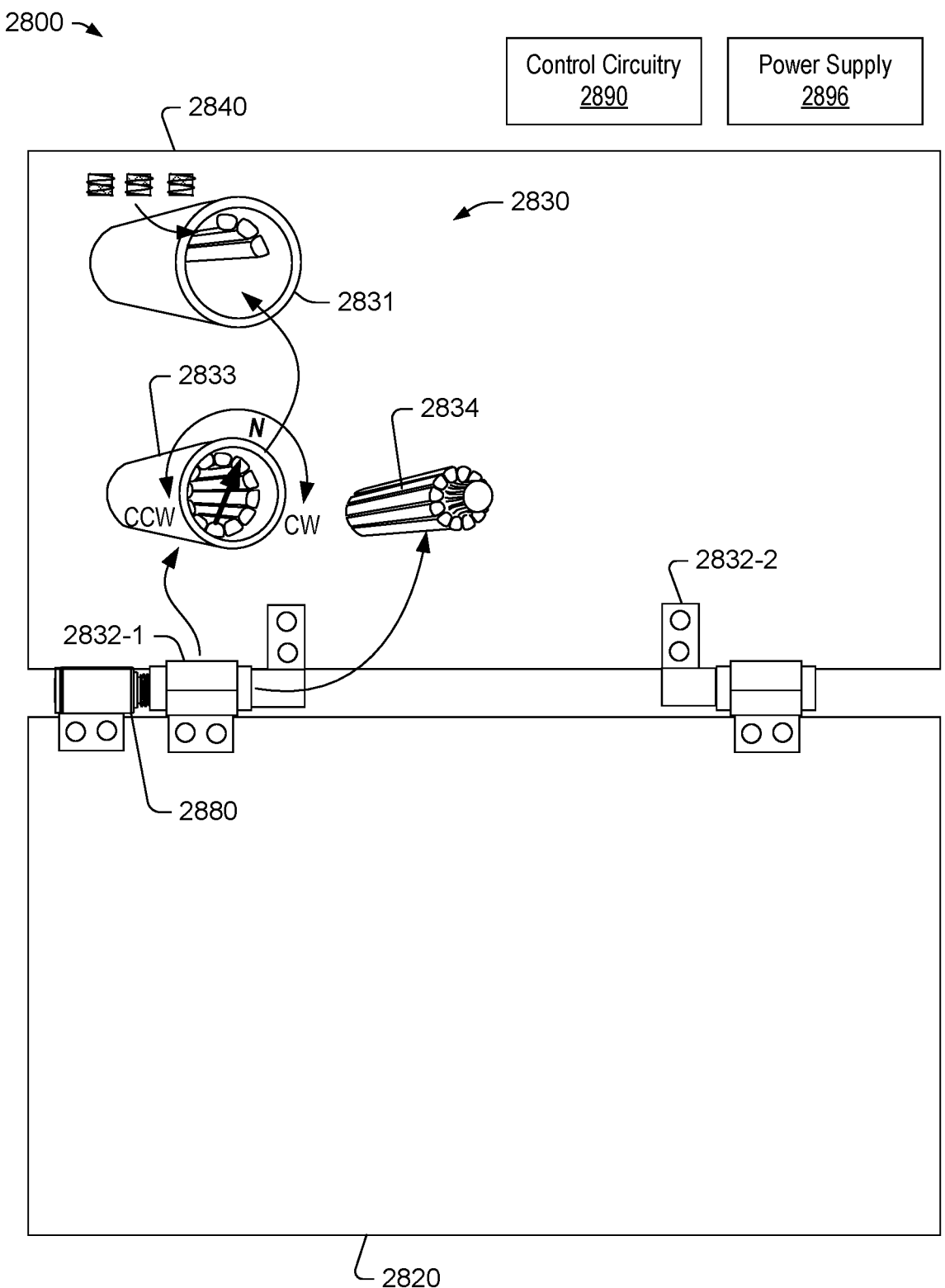
FIG. 28 is a diagram of an example of a system.

FIG. 28 shows an example of a system 2800 that includes a housing 2840; a hinge assembly 2830 operatively coupled to the housing 2840 for rotation of the housing 2840 about a hinge axis, where the hinge assembly 2830 includes permanent magnets that generate a first magnetic field and a second magnetic field orientable with respect to each other via rotation of the housing 2040, where the first magnetic field and the second magnetic field include an aligned orientation, which may be considered to be a detent orientation that acts to stabilize the housing 2040.

As shown, the hinge assembly 2830 can include an EPM assembly 2831, a stator 2833, which may be a rotor barrel, and a rotor 2834, which may be an innermost rotor. In such an example, the stator 2833 may be adjustable via operation of the EPM assembly 2831.

In the example of FIG. 28, the system can include one or more EM movers 2880, which may include one or more EPMs and/or one or more non-EPMs. As an example, the EM mover 2880 may be a stepper motor, a linear motor or a linear-rotary motor. As an example, the EM mover 2880 may be configured for rotation of one or more components, assemblies, etc.

In the example of FIG. 28, the EM mover 2880 can be included and can be operatively coupled to the housing 2840 for rotation of the housing 2840 about the hinge axis and/or that can be operatively coupled to the stator 2833 for rotation of the stator 2833 to alter an orientation of one or more magnetic fields. In such an example, the stator 2833 and the rotor 2834 can be aligned in a manner that provides a detent magnetic force. As an example, the stator 2833 and the rotor 2834 may include components that provide for N pole-pairs such as, for example, six N pole-pairs as shown in the example of FIG. 16.

As an example, an electric motor can be coupled to a transmission that may provide for engaging a rotor, a stator, etc. For example, consider engaging the rotor 2834 to rotate the housing 2840 and consider engaging the stator 2833 to rotate the stator 2833.

In the example of FIG. 28, the system 2800 can include another housing 2820, which may be coupled to the housing 2840 via the hinge assembly 2830. In the example of FIG. 28, the system 2800 can include control circuitry 2890, which can be operatively coupled to one or more of the EM mover 2880 and the EPM assembly 2831. In the example of FIG. 28, the control circuitry 2890 may be carried by a housing, such as, for example, the housing 2820 and/or the housing 2840.

In the example of FIG. 28, the hinge assembly 2830 can include multiple hinges such as a hinge 2832-1 and a hinge 2832-2. In such an example, the hinge 2832-1 and/or the hinge 2832-2 can include permanent magnets (e.g., one or more EPMs and/or one or more non-EPMs).

As an example, a system can include one or more hinges operatively coupled to an EM mover.

In the example of FIG. 28, the system 2800 can include a power supply 2896 such as one or more batteries such as, for example, one or more rechargeable lithium-ion batteries.

As an example, a method can include instructing an EM mover to rotate a barrel where a signal causes release of a locking mechanism of the EM mover followed by movement of a shaft of the EM mover that is followed by locking to secure the barrel in a desired rotational position.

Figure 29:
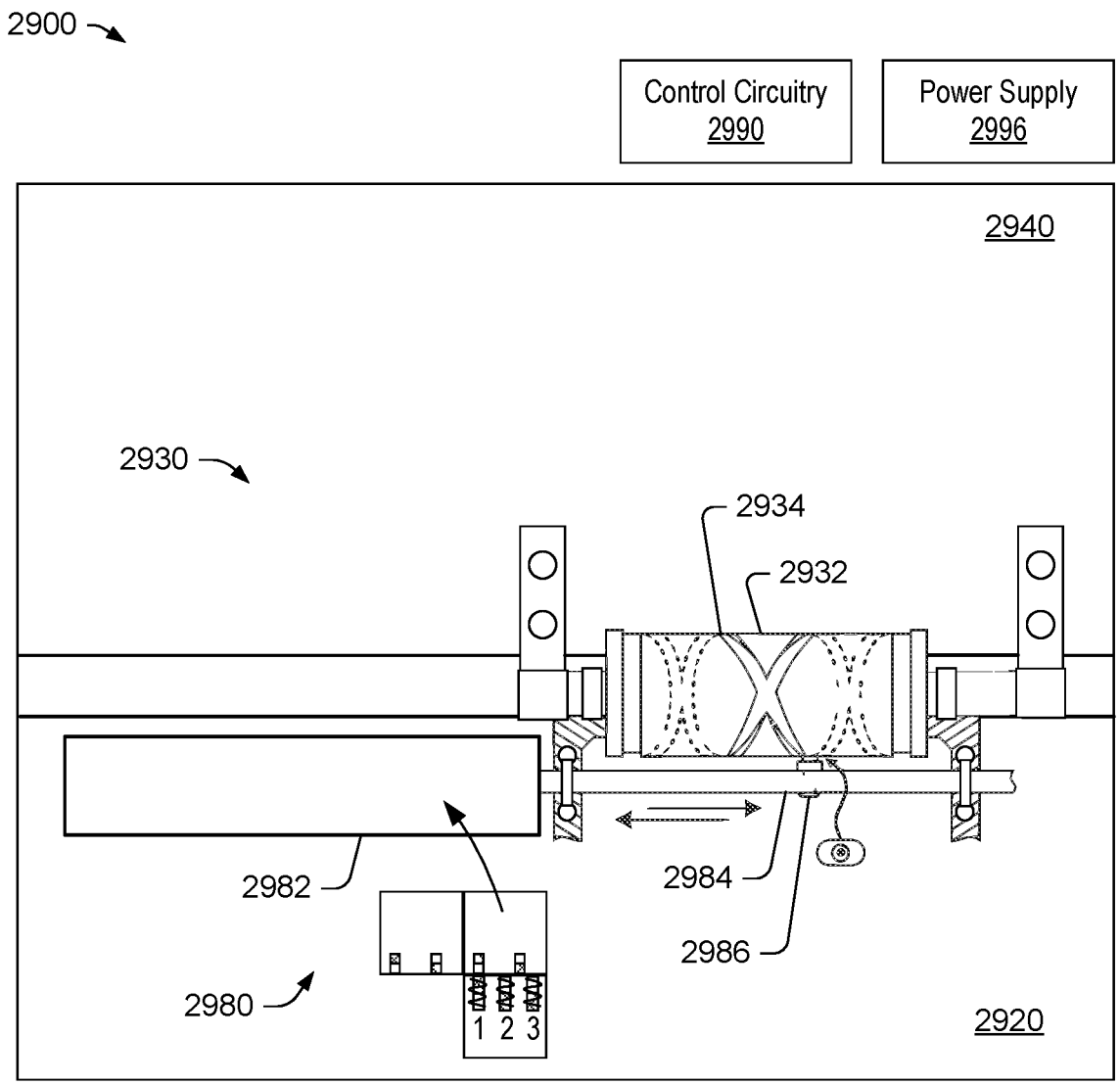
FIG. 29 is a diagram of an example of a portion of a system.

FIG. 29 shows an example of a system 2900 that includes a housing 2940; a hinge assembly 2930 operatively coupled to the housing 2940 for rotation of the housing about a hinge axis, where the hinge assembly 2930 includes permanent magnets (e.g., EPM and/or non-EPM) that generate a first magnetic field and a second magnetic field orientable with respect to each other. The system 2900 also includes an EM mover 2980, which may be part of the hinge assembly 2930.

In the example of FIG. 29, the EM mover 2980 can include one or more sub-assemblies, for example, consider one or more of the sub-assemblies 2402 and 2404 of FIG. 24. As shown, the EM mover 2980 can include a body 2982 and a shaft 2984 with a coupling 2986 where the shaft 2984 can translate along a shaft axis and where the hinge assembly 2930 includes a barrel 2932 with a groove or grooves 2934 where the coupling 2986 can interact with the groove or grooves 2934 to cause rotation of the barrel 2932. In such an example, the barrel 2932 can include one or more pole-pairs of permanent magnets whereby the EM mover 2980 can rotate the barrel 2932 to adjust an orientation of the one or more pole-pairs. As mentioned, an adjustment may be for a detent and/or for a restoring torque that can offset a gravity related torque.

In the example of FIG. 29, the hinge assembly 2930 includes one or more transmission components that, as shown, can provide for transformation of linear motion to rotational motion. In the example of FIG. 29, by cutting the continuous spiral groove 2934 on a cam surface of the barrel 2932 and by placing an elliptical shape slider coupling 2986 on the shaft 2984 that can be moved to slide along the spiral groove 2934, the elliptical shape slider coupling 2986 linear motion of the shaft 2984 can cause rotation of the barrel 2932.

In the example of FIG. 29, the system 2900 can include control circuitry 2990, which can be operatively coupled to the EM mover 2980. In the example of FIG. 29, the system 2900 can include a power supply 2996 such as one or more batteries such as, for example, one or more rechargeable lithium-ion batteries.

As an example, the EM mover 2980 can include a lock that acts to lock the shaft 2984, which may act to lock the position of the barrel 2932. In such an example, the barrel 2932 may be supported in a freely rotatable manner by one or more bushings as locking and unlocking may be controlled via the electromagnetic mover 2980. As an example, locking and unlocking may be achieved via magnetic connection forces that can attract sub-assemblies. As to an amount of magnetic connection force, it may be determined by a number of EPMs that are included in the EM mover 2980, which can be aligned with corresponding magnets. As an example, the EM mover 2980 may include multiple sets of EPMs that can translate and hold multiple sets of magnets of the shaft 2984. In such an example, the force applied to move the shaft and the holding or locking force of the shaft may be tailored (e.g., through selective use of EPMs of the multiple sets of EPMs). While the example of FIG. 29 shows separated component EPMs, where certain magnets are movable with respect to others, one or more EPMs such as the EPM 2100 of FIG. 21 may be utilized.

As an example, an EM mover can include one or more gears that can be rotatable and mesh with one or more other gears. As explained, one or more techniques may be utilized to operatively couple an EM mover to barrel, to a housing, etc.

As an example, a system can be a clamshell computing system with two housings rotatably coupled via a hinge assembly that includes permanent magnets. In such an example, an EM mover may be included that can be a rotational mover and/or a linear mover where torque can be generated directly or indirectly to cause rotational movement of one or more components of the system.

As an example, a system can include a directional sensor that can be or include one or more of an accelerometer, a gyroscope, a metallic fluid switch (e.g., a level switch), etc. Such types of sensors can provide directional information as to how a system or a portion thereof is oriented. As mentioned, a hinge assembly can include permanent magnets that can provide a detent torque and/or a restoring torque; however, in various instances, a detent torque may be at an undesirable rotational position and/or a restoring torque may not provide for a substantial reduction in gravity related torque.

As to acceptable orientations for a restoring torque consider, for example, a range of angles from approximately minus N degrees to plus M degrees. In such an example, the angles may be symmetric or asymmetric about horizontal being zero degrees. For example, consider a desk that may have a desktop surface that is angled downwardly such that a front edge of a system is lower than a back edge of the system. In such an example, a range from 0 degrees to approximately minus 30 degrees may be considered. As to another scenario, consider a user sitting on a chair with the user's hips elevated with respect to the user's knees such that the user's thighs (e.g., lap) slants downwardly away from the hips of the user. In such a scenario, where a user places a clamshell computing system (e.g., a laptop) on her lap, the front edge of the system can be higher than a back edge of the system. In such an example, a range from 0 degrees to approximately plus 20 degrees may be considered.

As an example, a system can include one or more adjustment mechanisms that can provide a detent torque (e.g., a detent force) at a desired angle and/or that can provide an orientation for a restoring torque at a desired angle with respect to gravity (e.g., that counteracts a gravity related torque).

As explained, an approach may depend on how torque versus opening angle curves align or not where one curve corresponds to a gravity related torque and the other curve corresponds to a magnet related torque where a net torque may be determined.

As an example, a system can include a first housing that can include a processor and memory accessible to the processor; a second housing that includes a display operatively coupled to a processor (e.g., a processor of the first housing and/or a processor of the second housing); and a hinge assembly that rotatably couples the first housing and the second housing, where the hinge assembly includes permanent magnets that generate a first magnetic field and a second magnetic field orientable with respect to each other.

As an example, EM mover circuitry may be tailored using one or more measurements acquired by one or more sensors. For example, consider a schedule that can specify a relationship between angle and power (e.g., current, etc.).

As an example, a method may include an integral torque sensor, which may be utilized to measure torque and cause issuance of a signal (e.g., an instruction, a command, a sound, a graphic, a light, etc.) where the signal may be utilized for one or more purposes. For example, consider a signal to guide a user in making an adjustment. As another example, a signal can be utilized as part of an EM mover approach to making an adjustment to a barrel for purposes of a detent torque or a restoring torque. As an example, EM mover circuitry may provide a feedback loop where magnetic torque can be generated and/or oriented in a manner that depends on a torque measurement or torque determination.

As to a position and/or motion sensor, consider one or more of a gravity sensor, an accelerometer, a gyroscope, a level sensor, a distance sensor, and a rotational position sensor. In such an example, a measurement may indicate a direction of gravity with respect to a system or a portion of a system. As an example, the angle formed by the direction of gravity with respect to a display housing can depend on a rotational position of the display housing. Where a display housing includes a sensor that can measure the direction of gravity, the angle of the display housing may be determined. As an example, a keyboard housing may include such a sensor where measurements from a display housing sensor and a keyboard housing sensor can be utilized to determine an open angle (e.g., a value of the angle Φ) of the display housing with respect to the keyboard housing. In such an example, a signal may be issued that indicates how an adjustment may be made, for example, to barrel that can alter an orientation of one or more permanent magnet pole-pairs for achieving a desired balance of torque.

As an example, a system may provide feedback that can be interpreted by a user such that the user can make one or more adjustments to the system, which may be an adjustment to a display housing, an adjustment to a keyboard housing (e.g., adjusting with respect to gravity, etc.), or an adjustment to the system that adjusts both the display housing and the keyboard housing. For example, consider feedback rendered to a display of the display housing that instructs a user to "level" the keyboard housing to make it substantially horizontal or to dispose it at an angle other than horizontal, which may depend on a position of a center of mass of a display housing. As an example, feedback can include measuring or detecting a position of a center of mass. As explained, one or more sensors may be utilized to provide a signal or signals, which may provide for feedback such that a user and/or the system itself may make one or more adjustments to the system, for example, as to torque or torques.

As an example, an assembly can include a rotor that defines a rotor axis and that includes a number of permanent magnets; a stator that defines a stator axis, coaxially aligned with the rotor axis, and that includes a number of electropermanent magnets; and a controller that controls polarity of the electropermanent magnets to rotate the rotor about the rotor axis. In such an example, the controller may control rotation of the rotor about the rotor axis according a step angle that is less than 360 degrees. For example, consider a step angle that can be less than or equal to 90 degrees.

As an example, an assembly can include electropermanent magnets that are disposed at angular increments with respect to a stator axis, where the angular increments define, at least in part, step angles. In such an example, a controller can control polarity of at least a portion of the electropermanent magnets to rotate a rotor by at least one of the step angles.

As an example, an assembly can include a number of electropermanent magnets that is at least three (e.g., at least three electropermanent magnets). As an example, a number of permanent magnets may be at least four. As an example, an assembly can include a number of permanent magnets that are not electropermanent magnets that exceeds a number of electropermanent magnets.

As an example, an assembly can include permanent magnets that are disposed at angular increments with respect to a rotor axis. In such an example, the angular increments can be defined by an increment angle, where the increment angle, in degrees, is defined by 360 degrees divided by the number of permanent magnets. In such an example, electropermanent magnets may be disposed at angular increments with respect to a stator axis. In such an example, the angular increments of the permanent magnets that are not electropermanent magnets can differ from the angular increments of the electropermanent magnets. As an example, angular increments of electropermanent magnets can be defined by an increment angle with respect to a stator axis and angular increments of the permanent magnets that are not electropermanent magnets can be defined by an increment angle with respect to the rotor axis that exceeds the increment angle of the electropermanent magnets. In such an example, the increment angle of the electropermanent magnets can be less than or equal to 60 degrees where the increment angle of the permanent magnets that are not electropermanent magnets is less than or equal to 90 degrees.

As explained with respect to the example of FIG. 26, angular increments of stator permanent magnets and angular increments of rotor permanent magnets may be divisible by a common angle. For example, 30 degrees and 45 degrees are both divisible by 15 degrees. In the example of FIG. 26, the step angle can be defined by the angular increments of the stator and the rotor. As shown, the step angle can be less than the angular increments of the stator and less than the angular increments of the rotor. As shown in the example of FIG. 26, a step angle may be a greatest common divisor angle. As explained, as an example, an assembly that is a stepper motor that includes electropermanent magnets can provide a step angle that is less than an angle between two of the electropermanent magnets. In such an example, the step angle can be less than an angle between two permanent magnets of a rotor. Such an approach may provide for a relatively fine or finer step angle than a multi-phase electric stepper motor such as the Phase A and Phase B stepper motor 1100 of FIG. 11 and FIG. 12A. In such an example, need for a transmission or a greater ratio transmission may be reduced (e.g., consider a 90 degree step angle versus a 15 degree step angle). In comparison to the series AM2224 Faulhaber stepper motor, which is a two phase, 24 steps per revolution stepper motor, the example stepper motor of FIG. 26 can provide 24 steps per revolution without a demand for an arrangement of coils for two separate phases positioned about a rotor.

As an example, a particular system may demand angular motion that is less than 360 degrees such that an EM mover can be downsized accordingly. For example, consider the stepper motor 2500 of FIG. 25 where angular motion (e.g., rotary motion) of approximately 180 degrees is sufficient for a system. In such an example, the rotor 2501 may include fewer permanent magnets. As explained, where an increase in torque is desired, more electropermanent magnets may be added to a stator. For example, in FIG. 25, another three electropermanent magnets may be added (e.g., at an opposing side). In such an example, the rotor may be rotatable by 360 degrees or less, for example, depending on demands of a system.

As an example, an assembly can include a controller that includes at least one of a clockwise rotation control sequence and a counterclockwise control sequence. As an example, a method can include issuing a signal that corresponds to a control sequence where the signal may be based on one or more inputs (e.g., a sensor input, a human input device input, an operating system input, an application input, etc.).

As an example, the permanent magnets can include NdFeB magnets (e.g., NIB magnets). Such magnets may be part of an electropermanent magnet such as the EPM 2100 of FIG. 21 or they may be part of an assembly that includes electropermanent magnets such as the assembly 2300 of FIG. 23, etc. As an example, a coil and an Alnico5 magnetic material may form a sub-assembly that may be referred to as a simplified electropermanent magnet (SEP), which can be utilized in combination with one or more higher coercivity magnetic materials (e.g., NIB).

As an example, a controller can control current to electropermanent magnets to control polarity of the electropermanent magnets to rotate the rotor about the rotor axis. In such an example, the controller may control current individually to individual electropermanent magnets. For example, to cause a stepper motor to step, a controller may control current to a single electropermanent magnet, for example, to cause a pole reversal of that single electropermanent magnet.

As an example, an assembly can include a hinge assembly and a hinge coupling that operatively couples a rotor to the hinge assembly, where rotation of the rotor about a rotor axis causes rotation of a component of the hinge assembly. In such an example, the component can be a leaf (e.g., a hinge leaf). As an example, an assembly can include a display housing coupled to a leaf of a hinge assembly where, for example, the hinge assembly rotatably couples the display housing to a keyboard housing.

As an example, a method can include, in an assembly that includes a rotor that defines a rotor axis and that includes a number of permanent magnets, a stator that defines a stator axis, coaxially aligned with the rotor axis, and that includes a number of electropermanent magnets, and a controller that controls polarity of the electropermanent magnets to rotate the rotor about the rotor axis, issuing a control signal to control polarity of the electropermanent magnets to rotate the rotor.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 30:
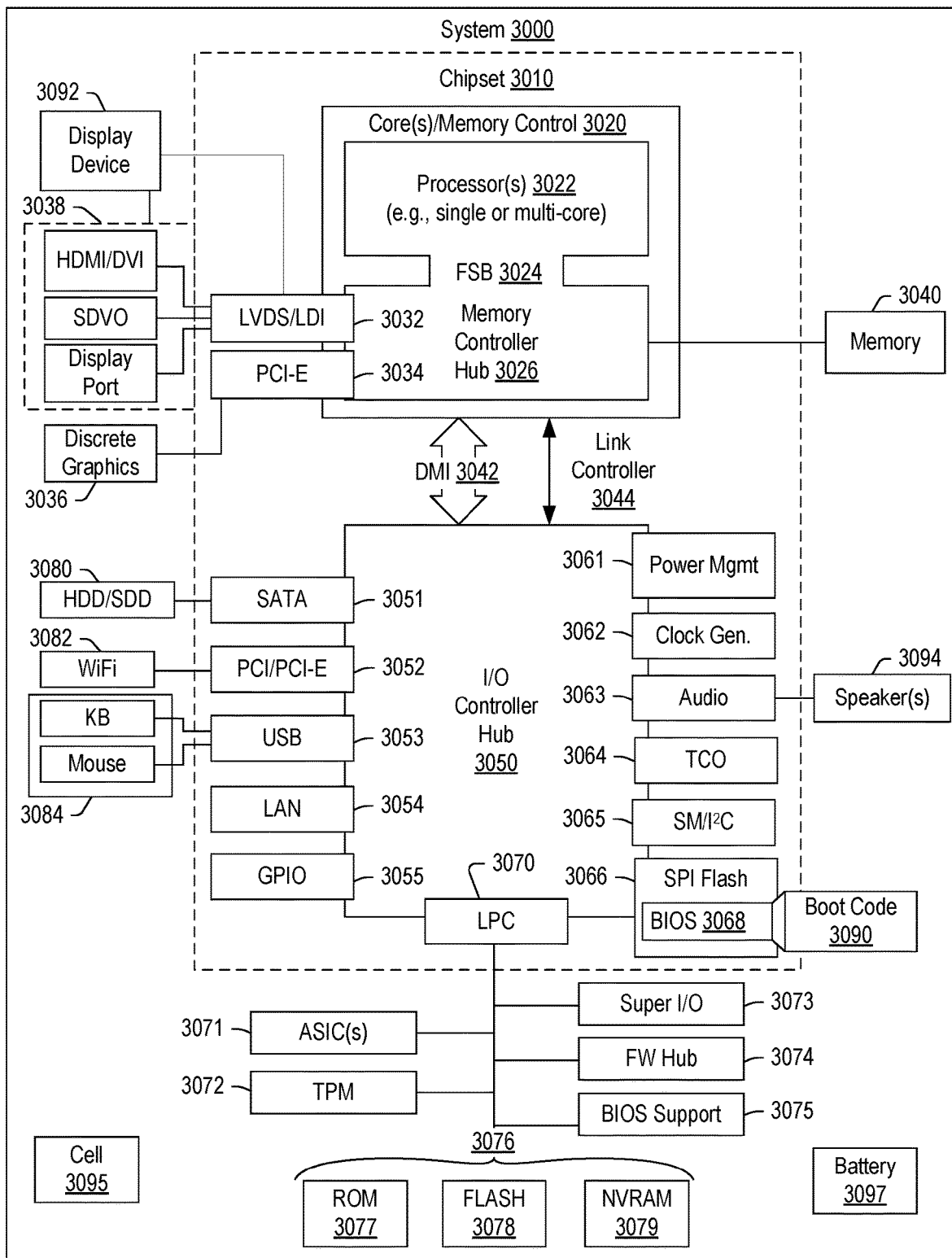
FIG. 30 is a diagram of an example of a system that includes one or more processors.

While various examples of circuits or circuitry have been discussed, FIG. 30 depicts a block diagram of an illustrative computer system 3000. The system 3000 may be a desktop computer system, such as one of the ThinkCentre® or ThinkPad@series of personal computers sold by Lenovo (US) Inc. of Morrisville, NC, or a workstation computer, such as the ThinkStation@, which are sold by Lenovo (US) Inc. of Morrisville, NC; however, as apparent from the description herein, a satellite, a base, a server or other machine may include other features or only some of the features of the system 3000. As an example, a system such as the system 100 of FIG. 1 may include at least some of the features of the system 3000.

As shown in FIG. 30, the system 3000 includes a so-called chipset 3010. A chipset refers to a group of integrated circuits, or chips, that are designed (e.g., configured) to work together. Chipsets are usually marketed as a single product (e.g., consider chipsets marketed under the brands INTEL@, AMD@, etc.).

In the example of FIG. 30, the chipset 3010 has a particular architecture, which may vary to some extent depending on brand or manufacturer. The architecture of the chipset 3010 includes a core and memory control group 3020 and an I/O controller hub 3050 that exchange information (e.g., data, signals, commands, etc.) via, for example, a direct management interface or direct media interface (DMI) 3042 or a link controller 3044. In the example of FIG. 30, the DMI 3042 is a chip-to-chip interface (sometimes referred to as being a link between a "northbridge" and a "southbridge").

The core and memory control group 3020 include one or more processors 3022 (e.g., single core or multi-core) and a memory controller hub 3026 that exchange information via a front side bus (FSB) 3024. As described herein, various components of the core and memory control group 3020 may be integrated onto a single processor die, for example, to make a chip that supplants the conventional "northbridge" style architecture.

The memory controller hub 3026 interfaces with memory 3040. For example, the memory controller hub 3026 may provide support for DDR SDRAM memory (e.g., DDR, DDR2, DDR3, etc.). In general, the memory 3040 is a type of random-access memory (RAM). It is often referred to as "system memory".

The memory controller hub 3026 further includes a low-voltage differential signaling interface (LVDS) 3032. The LVDS 3032 may be a so-called LVDS Display Interface (LDI) for support of a display device 3092 (e.g., a CRT, a flat panel, a projector, etc.). A block 3038 includes some examples of technologies that may be supported via the LVDS interface 3032 (e.g., serial digital video, HDMI/DVI, display port). The memory controller hub 3026 also includes one or more PCI-express interfaces (PCI-E) 3034, for example, for support of discrete graphics 3036. Discrete graphics using a PCI-E interface has become an alternative approach to an accelerated graphics port (AGP). For example, the memory controller hub 3026 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 3050 includes a variety of interfaces. The example of FIG. 30 includes a SATA interface 3051, one or more PCI-E interfaces 3052 (optionally one or more legacy PCI interfaces), one or more USB interfaces 3053, a LAN interface 3054 (more generally a network interface), a general purpose I/O interface (GPIO) 3055, a low-pin count (LPC) interface 3070, a power management interface 3061, a clock generator interface 3062, an audio interface 3063 (e.g., for speakers 3094), a total cost of operation (TCO) interface 3064, a system management bus interface (e.g., a multi-master serial computer bus interface) 3065, and a serial peripheral flash memory/controller interface (SPI Flash) 3066, which, in the example of FIG. 30, includes BIOS 3068 and boot code 3090. With respect to network connections, the I/O hub controller 3050 may include integrated gigabit Ethernet controller lines multiplexed with a PCI-E interface port. Other network features may operate independent of a PCI-E interface.

The interfaces of the I/O hub controller 3050 provide for communication with various devices, networks, etc. For example, the SATA interface 3051 provides for reading, writing or reading and writing information on one or more drives 3080 such as HDDs, SDDs or a combination thereof. The I/O hub controller 3050 may also include an advanced host controller interface (AHCI) to support one or more drives 3080. The PCI-E interface 3052 allows for wireless connections 3082 to devices, networks, etc. The USB interface 3053 provides for input devices 3084 such as keyboards (KB), one or more optical sensors, mice and various other devices (e.g., microphones, cameras, phones, storage, media players, etc.). On or more other types of sensors may optionally rely on the USB interface 3053 or another interface (e.g., $I^2C$, etc.). As to microphones, the system 3000 of FIG. 30 may include hardware (e.g., audio card) appropriately configured for receipt of sound (e.g., user voice, ambient sound, etc.).

In the example of FIG. 30, the LPC interface 3070 provides for use of one or more ASICs 3071, a trusted platform module (TPM) 3072, a super I/O 3073, a firmware hub 3074, BIOS support 3075 as well as various types of memory 3076 such as ROM 3077, Flash 3078, and non-volatile RAM (NVRAM) 3079. With respect to the TPM 3072, this module may be in the form of a chip that can be used to authenticate software and hardware devices. For example, a TPM may be capable of performing platform authentication and may be used to verify that a system seeking access is the expected system.

The system 3000, upon power on, may be configured to execute boot code 3090 for the BIOS 3068, as stored within the SPI Flash 3066, and thereafter processes data under the control of one or more operating systems and application software (e.g., stored in system memory 3040). An operating system may be stored in any of a variety of locations and accessed, for example, according to instructions of the BIOS 3068. Again, as described herein, a satellite, a base, a server or other machine may include fewer or more features than shown in the system 3000 of FIG. 30. Further, the system 3000 of FIG. 30 is shown as optionally include cell phone circuitry 3095, which may include GSM, CDMA, etc., types of circuitry configured for coordinated operation with one or more of the other features of the system 3000. Also shown in FIG. 30 is battery circuitry 3097, which may provide one or more battery, power, etc., associated features (e.g., optionally to instruct one or more other components of the system 3000). As an example, a SMBus may be operable via a LPC (see, e.g., the LPC interface 3070), via an $I^2C$ interface (see, e.g., the SM/$I^2C$ interface 3065), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:
1. An assembly comprising:
a rotor that defines a rotor axis and that comprises a number of permanent magnets;
a stator that defines a stator axis, coaxially aligned with the rotor axis, and that comprises a number of electropermanent magnets, wherein the number of permanent magnets, that are not electropermanent magnets, exceeds the number of electropermanent magnets;
a controller that controls polarity of the electropermanent magnets to rotate the rotor about the rotor axis; and
a hinge assembly that comprises an additional number of permanent magnets that reduce a rotational torque requirement of the hinge assembly, wherein rotation of the rotor about the rotor axis causes rotation of a component of the hinge assembly.

2. The assembly of claim 1, wherein the controller controls rotation of the rotor about the rotor axis according a step angle that is less than 360 degrees.

3. The assembly of claim 2, wherein the step angle is less than or equal to 90 degrees.

4. The assembly of claim 1, wherein the electropermanent magnets are disposed at angular increments with respect to the stator axis, wherein the angular increments define, at least in part, step angles.

5. The assembly of claim 4, wherein the controller controls polarity of at least a portion of the electropermanent magnets to rotate the rotor by at least one of the step angles.

6. The assembly of claim 1, wherein the number of electropermanent magnets is at least three.

7. The assembly of claim 1, wherein the number of permanent magnets is at least four.

8. The assembly of claim 1, wherein the permanent magnets are disposed at angular increments with respect to the rotor axis.

9. The assembly of claim 8, wherein the angular increments are defined by an increment angle, wherein the increment angle, in degrees, is defined by 360 degrees divided by the number of permanent magnets.

10. The assembly of claim 8, wherein the electropermanent magnets are disposed at angular increments with respect to the stator axis.

11. The assembly of claim 10, wherein the angular increments of the permanent magnets, that are not electropermanent magnets, differ from the angular increments of the electropermanent magnets.

12. The assembly of claim 10, wherein the angular increments of the electropermanent magnets are defined by an increment angle with respect to the stator axis and wherein the angular increments of the permanent magnets, that are not electropermanent magnets, are defined by an increment angle with respect to the rotor axis that exceeds the increment angle of the electropermanent magnets.

13. The assembly of claim 12, wherein the increment angle of the electropermanent magnets is less than or equal to 60 degrees and wherein the increment angle of the permanent magnets, that are not electropermanent magnets, is less than or equal to 90 degrees.

14. The assembly of claim 1, wherein the controller comprises at least one of a clockwise rotation control sequence and a counterclockwise control sequence.

15. The assembly of claim 1, wherein the permanent magnets comprise NdFeB magnets.

16. The assembly of claim 1, wherein the controller controls current to the electropermanent magnets to control polarity of the electropermanent magnets to rotate the rotor about the rotor axis.

17. The assembly of claim 1, wherein the component comprises a leaf and further comprising a display housing coupled to the leaf, wherein the hinge assembly rotatably couples the display housing to a keyboard housing.

18. The assembly of claim 1, wherein the number of electropermanent magnets is three.

19. The assembly of claim 1, wherein the component comprises a rotational component axis that is aligned with the rotor axis and wherein the number of additional permanent magnets reduce the rotational torque requirement by offsetting at least a portion of gravity and mass related torque.

20. A method comprising:

in an assembly that comprises a rotor that defines a rotor axis and that comprises a number of permanent magnets, a stator that defines a stator axis, coaxially aligned with the rotor axis, and that comprises a number of electropermanent magnets, wherein the number of permanent magnets, that are not electropermanent magnets, exceeds the number of electropermanent magnets, a controller that controls polarity of the electropermanent magnets to rotate the rotor about the rotor axis, and a hinge assembly that comprises an additional number of permanent magnets that reduce a rotational torque requirement of the hinge assembly, wherein rotation of the rotor about the rotor axis causes rotation of a component of the hinge assembly, issuing a control signal to control polarity of the electropermanent magnets to rotate the rotor.

* * * * *